(12) United States Patent
Rankin et al.

(10) Patent No.: US 11,769,424 B2
(45) Date of Patent: Sep. 26, 2023

(54) METHOD, APPARATUS, AND COMPUTER PROGRAM PRODUCT FOR MEASURING AND INTERPRETING METRICS OF AN ATHLETIC ACTION AND AN OBJECT ASSOCIATED THEREWITH

(71) Applicant: F5 SPORTS, INC., Winston Salem,, NC (US)

(72) Inventors: David Benjamin Rankin, Winston Salem,, NC (US); Steven Alexis Cukiernik, Winston Salem,, NC (US)

(73) Assignee: F5 SPORTS, INC., Winston Salem, NC (US)

( * ) Notice: Subject to any disclaimer, the term of this patent is extended or adjusted under 35 U.S.C. 154(b) by 0 days.

(21) Appl. No.: 17/661,853

(22) Filed: May 3, 2022

(65) Prior Publication Data
US 2022/0362629 A1 Nov. 17, 2022

Related U.S. Application Data

(62) Division of application No. 16/100,584, filed on Aug. 10, 2018, now Pat. No. 11,344,769.

(Continued)

(51) Int. Cl.
| | |
|---|---|
| G09B 19/00 | (2006.01) |
| A63B 69/00 | (2006.01) |
| G01P 3/44 | (2006.01) |
| G01P 15/03 | (2006.01) |
| A63B 24/00 | (2006.01) |
| G01C 19/02 | (2006.01) |

(Continued)

(52) U.S. Cl.
CPC ...... G09B 19/0038 (2013.01); A63B 24/0003 (2013.01); A63B 24/0006 (2013.01);
(Continued)

(58) Field of Classification Search
None
See application file for complete search history.

(56) References Cited

U.S. PATENT DOCUMENTS 11,582,426 B2   2/2023   Kim
2007/0135225 A1*  6/2007   Nieminen ............ A63B 69/36
                                                  473/409

(Continued)

FOREIGN PATENT DOCUMENTS

EP   2 657 924 A1   10/2013
JP   H06-105940 A    4/1994

(Continued)

OTHER PUBLICATIONS

International Search Report and Written Opinion for Application No. PCT/US2019/018218 dated May 17, 2019, 14 pages.

(Continued)

Primary Examiner — Jason T Yen
(74) Attorney, Agent, or Firm — Alston & Bird LLP

(57) ABSTRACT

Embodiments provided herein measure metrics of an athletic action and an object associated therewith, and more particularly, to measuring the metrics and characteristics of a baseball during the wind-up, release, flight, and catch of a pitch sequence. Methods may include: receiving, from at least one motion sensor associated with an object, acceleration data and angular velocity data of the object in response to an athletic action performed on the object; processing the acceleration data to establish vector rotation data between a frame of reference of the object and an Earth frame of reference; applying the vector rotation data to the acceleration data to obtain acceleration of the object in the Earth frame of reference; applying the vector rotation data to the angular velocity data to obtain angular velocity of the object in the Earth frame of reference.

20 Claims, 9 Drawing Sheets

Related U.S. Application Data

(60) Provisional application No. 62/632,333, filed on Feb. 19, 2018.

(51) Int. Cl.
*G06F 18/25* (2023.01)
*G06F 18/214* (2023.01)
*G06N 3/045* (2023.01)

(52) U.S. Cl.
CPC .......... *A63B 69/0002* (2013.01); *G01C 19/02* (2013.01); *G01P 3/44* (2013.01); *G01P 15/034* (2013.01); *G06F 18/214* (2023.01); *G06F 18/25* (2023.01); *G06N 3/045* (2023.01); *A63B 2024/0012* (2013.01); *A63B 2024/0034* (2013.01); *A63B 2069/0006* (2013.01); *A63B 2220/34* (2013.01); *A63B 2220/44* (2013.01); *A63B 2220/62* (2013.01); *A63B 2225/52* (2013.01)

(56) References Cited

U.S. PATENT DOCUMENTS

| | | | |
|---|---|---|---|
| 2011/0190912 A1 | 8/2011 | Paul et al. | |
| 2013/0073247 A1* | 3/2013 | Perkins | G01C 21/16 702/141 |
| 2013/0128022 A1* | 5/2013 | Bose | H04N 7/183 348/77 |
| 2014/0045630 A1* | 2/2014 | Perkins | G01P 1/02 473/570 |
| 2016/0001136 A1* | 1/2016 | King | A63B 24/0021 320/108 |
| 2016/0354666 A1* | 12/2016 | Greenwalt | G09B 19/0038 |
| 2018/0272221 A1* | 9/2018 | Sundararajan | G09B 9/00 |
| 2019/0099643 A1 | 4/2019 | Tsutsumi et al. | |

FOREIGN PATENT DOCUMENTS

| | | |
|---|---|---|
| JP | 2007-190365 A | 8/2007 |
| JP | 2013-090862 A | 5/2013 |
| JP | 2016-503893 A | 2/2016 |
| WO | WO 2017/131133 A1 | 8/2017 |

OTHER PUBLICATIONS

IN Application No. 202017038958, Examination Report dated Jul. 11, 2022, 7 pages.
EP Application No. 19 709 189.5, Office Action dated Jan. 3, 2023.
JP Application No. 2020-566201, Notification of Reasons for Rejection dated Jan. 5, 2023, 3 pgs.

* cited by examiner

METHOD, APPARATUS, AND COMPUTER PROGRAM PRODUCT FOR MEASURING AND INTERPRETING METRICS OF AN ATHLETIC ACTION AND AN OBJECT ASSOCIATED THEREWITH

CROSS-REFERENCE TO RELATED APPLICATIONS

This application is a divisional application of U.S. patent application Ser. No. 16/100,584, filed on Aug. 10, 2018, which claims priority to U.S. Provisional Application Ser. No. 62/632,333 entitled "Method for measuring lift and drag forces on a ball" filed on Feb. 19, 2018, the contents of which are hereby incorporated by reference in their entirety.

FIELD OF INVENTION

The present disclosure relates to measuring metrics of an athletic action and an object associated therewith, and more particularly, to measuring the metrics and characteristics of a baseball during the wind-up, release, flight, and catch of a pitch sequence.

BACKGROUND

Sporting and athletic activities typically involve physical actions taken by a person to produce a specific result. In golf, the physical action involves the swinging of a club to produce the result of contact with a golf ball to send the golf ball to a desired location. In tennis, the physical action involves swinging of a racket to contact a tennis ball and to direct the tennis ball to a desired location. In baseball, the physical action of a pitcher is the wind-up and pitching of a baseball along a trajectory toward home plate. In each case, athletes practice the physical actions involved in the sport to affect a specific result, and attempt to dial in and tune a result for precision and accuracy in order to improve at the relevant sport. In order to help these athletes achieve improvement, coaching is often relied upon where a coach observes the athlete's actions and provides instruction as to how to improve the action and hence, the result. Observation with the human eye is limited due to the speed with which some of these actions must occur. The striking of a golf ball occurs in fractions of a second such that it is difficult to observe how a golf club face impacted a golf ball other than to analyze the swing and analyze the trajectory of the ball. Similarly, in baseball, a pitch occurs so quickly that the different elements or phases of the wind-up and delivery may not be readily apparent to the naked eye. High speed cameras may provide additional information regarding an athlete's actions, though analysis of high speed camera footage can be expensive and time consuming, producing feedback of limited value from action to action. The use of sensors can also measure components of an action that may not be visible, such as the speed of a struck tennis ball or the speed, spin, and path of a pitched baseball. However, conventional sensors such as radar guns or multi-viewpoint camera and radar systems are complex and expensive, and also require expertise to operate and obtain information from. It is desirable to have a low cost, easily implemented method of measuring the actions of an athlete that can provide immediate feedback regarding the actions of the athlete and how those actions may be improved.

SUMMARY

Accordingly, an object of this present disclosure is measuring metrics of an athletic action and an object associated therewith, and more particularly, to measuring the metrics and characteristics of a baseball during the wind-up, release, flight, and catch of a pitch sequence. Embodiments described herein may provide a method including: receiving, from at least one motion sensor associated with an object, acceleration data and angular velocity data of the object in response to an athletic action performed on the object; processing the acceleration data to establish vector rotation data between a frame of reference of the object and an Earth frame of reference; applying the vector rotation data to the acceleration data to obtain acceleration of the object in the Earth frame of reference; applying the vector rotation data to the angular velocity data to obtain angular velocity of the object in the Earth frame of reference; providing, as an input to a neural network, the acceleration of the object in the Earth frame of reference and the angular velocity of the object in the Earth frame of reference; receiving from the neural network an analysis of the athletic action performed on the object; and providing for display of the analysis of the athletic action.

According to some embodiments, methods may include receiving from the neural network instruction with regard to the athletic action performed on the object as to how to improve the athletic action relative to an ideal iteration of the athletic action. Methods may include: integrating the acceleration of the object in the Earth frame of reference to obtain velocity of the object in the Earth frame of reference; and integrating the velocity of the object in the Earth frame of reference to obtain a position of the object in the Earth frame of reference. Methods may establish a path of the object through the Earth frame of reference in response to obtaining the position of the object in the Earth frame of reference over a period of time. Methods may optionally include deriving the angular acceleration of the object based on the angular velocity data.

Methods may include establishing a rate of rotation of the object based on the angular velocity of the object; and establishing at least one axis of rotation in the Earth frame of reference based on the angular acceleration of the object. In response to the angular velocity exceeding a range of a sensor to detect the angular velocity, methods may include: establishing a rate of rotation of the object prior to the angular velocity exceeding the range of the sensor; establishing an angular velocity of the object immediately following the athletic action; and calculating the rate of rotation and the angular velocity of the object that exceeds the range of the sensor based on the rate of rotation of the object prior to the angular velocity exceeding the range of the sensor and the angular velocity of the object immediately following the athletic action. Methods may optionally include: differentiating the acceleration of the object to obtain an angular jerk of the object; and determining a snap phase of the athletic action in response to a positive value for the angular jerk of the object followed by a negative value for the angular jerk of the object followed by a value for the angular jerk of the object that falls below a predetermined value.

Embodiments may provide a system for measuring an athletic action. Systems may include: an instrumented object acted upon by a user performing an athletic action. The object may include: at least one accelerometer; at least one gyroscope; at least one processor; and a communications interface. The at least one processor may be configured to receive, from the at least one accelerometer, an indication of a direction of gravity in response to the object being at rest. The at least one processor may be configured to receive, from at least one accelerometer, acceleration data in an object frame of reference. The at least one processor may be configured to receive, from the at least one gyroscope, angular velocity data in an object frame of reference. The processor may be configured to, using the indication of the direction of gravity, convert the acceleration data in the object frame of reference to acceleration data in an Earth frame of reference and convert the angular velocity data in the object frame of reference to angular velocity data in the Earth frame of reference. The system may include processing circuitry configured to: determine angular acceleration of the object in the Earth frame of reference based on a derivative of the angular velocity in the Earth frame of reference; determine velocity of the object in the Earth frame of reference based on an integration of the acceleration data in the Earth frame of reference; and determine position of the object in the Earth frame of reference based on an integration of the velocity of the object in the Earth frame of reference.

According to some embodiments, systems may include a neural network. The neural network may receive the angular acceleration of the object in the Earth frame of reference, the velocity of the object in the Earth frame of reference, and the position of the object in the Earth frame of reference as inputs. Where the neural network may produce a recommendation for improving the athletic action performed on the object in response to analysis of the inputs against a database of related athletic actions performed on an object. The gyroscope may include an upper spin rate limit, where in response to the instrumented object exceeding the spin rate limit, the gyroscope signal may become unreliable. The spin rate of the instrumented object above the spin rate limit may be calculated based on a spin rate prior to the spin rate exceeding the upper spin rate limit and a magnitude of an angular velocity vector of the instrumented object following being acted upon by the user.

Embodiments described herein may include an apparatus having: at least one accelerometer; at least one gyroscope; at least one processor; and at least one communications interface. In response to rotation of the apparatus relative to an Earth frame of reference, the apparatus may be configured to process data received from the at least one accelerometer, the at least one gyroscope, and the at least one processor to determine a rotation of the object in the Earth frame of reference. An orientation of the apparatus in the Earth frame of reference may be maintained in quaternion form. Rotation of the apparatus relative to the Earth frame of reference may be established in response to a gravitational force detected by the accelerometer. The communications interface may output position, angular velocity, and angular acceleration in the Earth frame of reference to a remote device. The angular velocity and angular acceleration may be compared against historical data, where the remote device may provide for display of feedback to improve at least one of the angular velocity and the angular acceleration relative to the received angular velocity and angular acceleration based on historical data.

According to some embodiments, the processor of the apparatus may be configured to: determine, based on a sinusoidal signal from the at least one accelerometer, a period of the sinusoid representing a spin rate; generate from the period of the sinusoid a finite impulse response high pass filter; and implement the finite impulse high pass filter as a moving average window filter on the signal from the at least one accelerometer to isolate lift and drag forces acting on an object associated with the apparatus. According to some embodiments, the apparatus may include at least one magnetometer, where the processor of the apparatus may be configured to: determine, based on a sinusoidal signal from the at least one magnetometer, a period of the sinusoid representing a spin rate; generate from the period of the sinusoid a finite impulse response high pass filter; and implement the finite impulse high pass filter as a moving average window filter on the signal from the at least one accelerometer to isolate lift and drag forces acting on an object associated with the apparatus. The processor may further be configured to isolate the lift force from the drag force based, at least in part, on a drag coefficient and a surface area of the object associated with the apparatus.

The apparatus of some example embodiments may further include at least one magnetometer. The processor may be configured to: receive three channels of data from the at least one magnetometer; determine zero crossings of a sinusoidal signal from each channel of data; average a time difference between two adjacent pairs of zero crossings of each of the three channels of data; and determine a period of spin from the averaged time difference. In response to an object associated with the apparatus being thrown by a user, the processor may be configured to: receive a signal from the at least one gyroscope; obtain the second derivative of the signal from the at least one gyroscope to establish an angular jerk signal having a value along a time axis; determine on the time axis a beginning of a Snap phase of the throw in response to a statistically significant increase in the value of the angular jerk signal; determine on the time axis a latter portion of the Snap phase of the throw in response to a change in the angular jerk signal from a positive value to a negative value; and determine an end of the Snap phase on the time axis in response to an angular jerk value of zero following the beginning of the Snap phase and the latter portion of the Snap phase. The processor may be configured to, based on a signal from the at least one accelerometer, determine a distance traveled by the object during the Snap phase. The processor may further be configured to, based on a signal from the at least one accelerometer, determine a change in speed of the object during the Snap phase. The processor may optionally be configured to, based on a signal from the at least one gyroscope, determine a change in spin axis of the object during the snap phase.

BRIEF DESCRIPTION OF THE DRAWINGS

Figure 1:
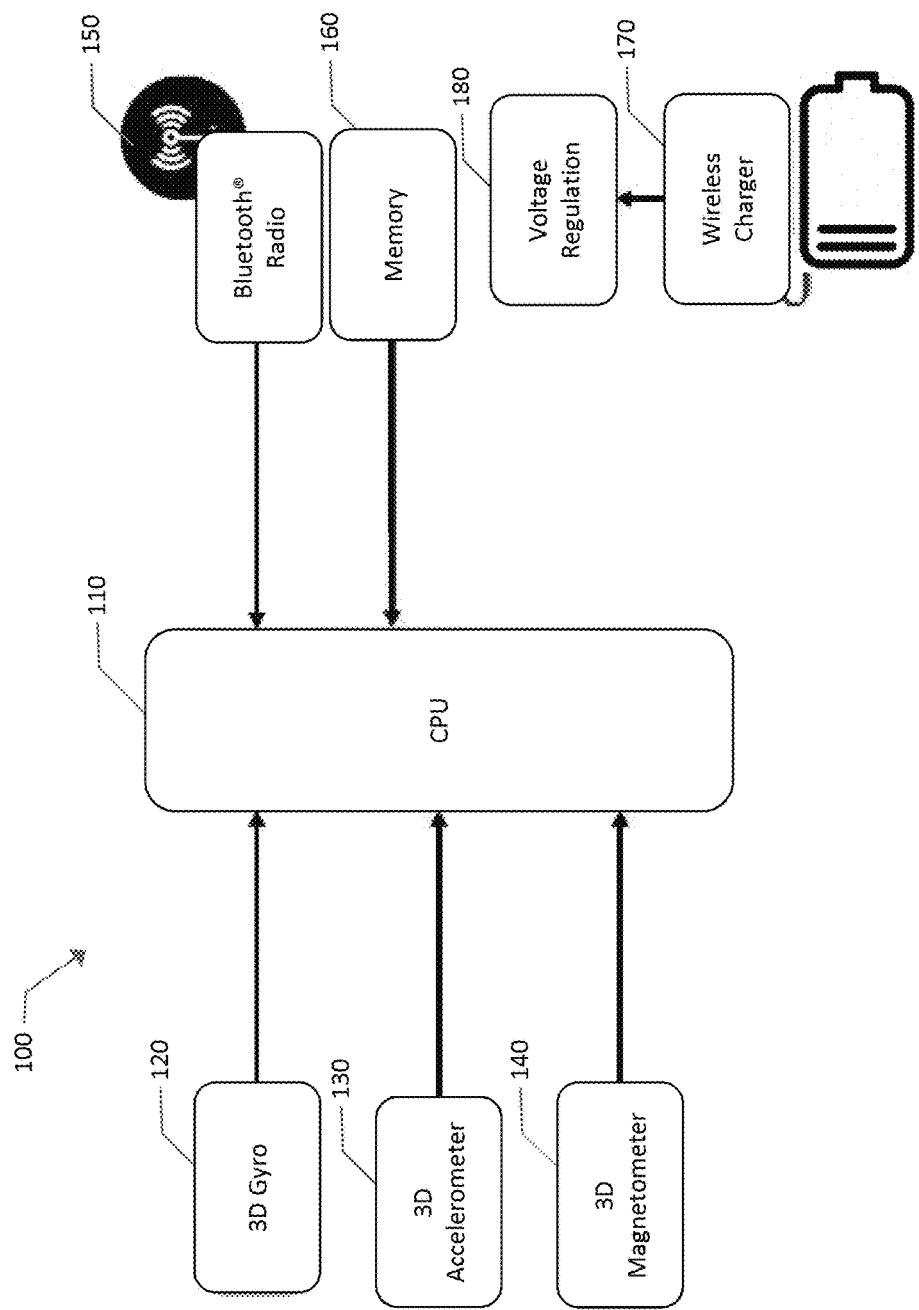
Figure 2:
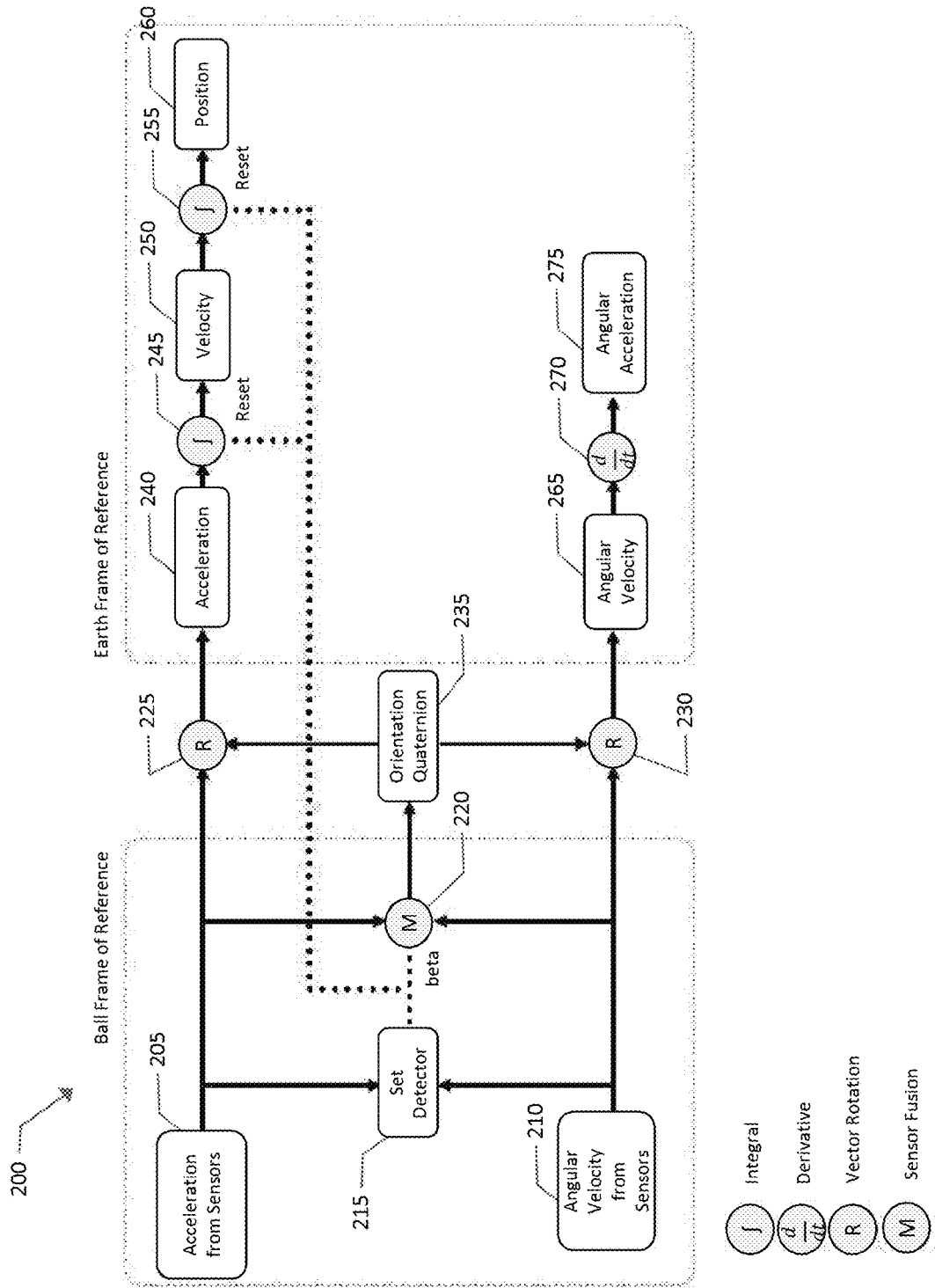
Figure 3:
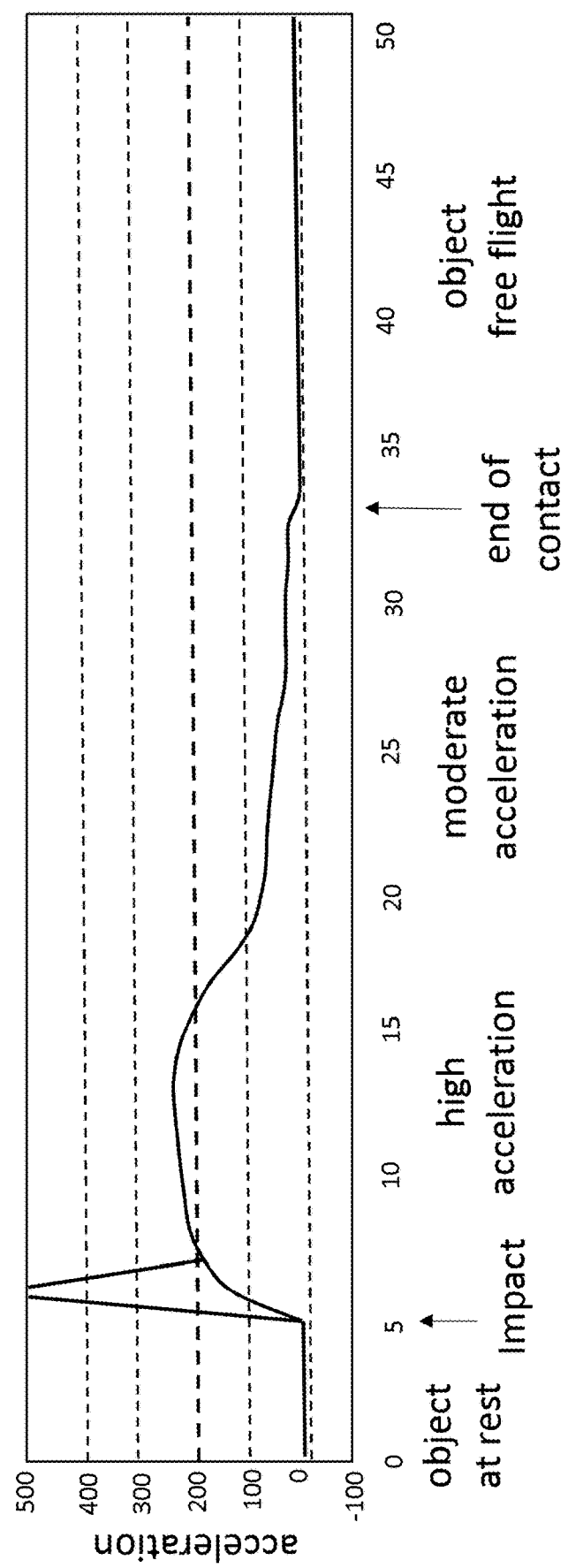
Figure 4:
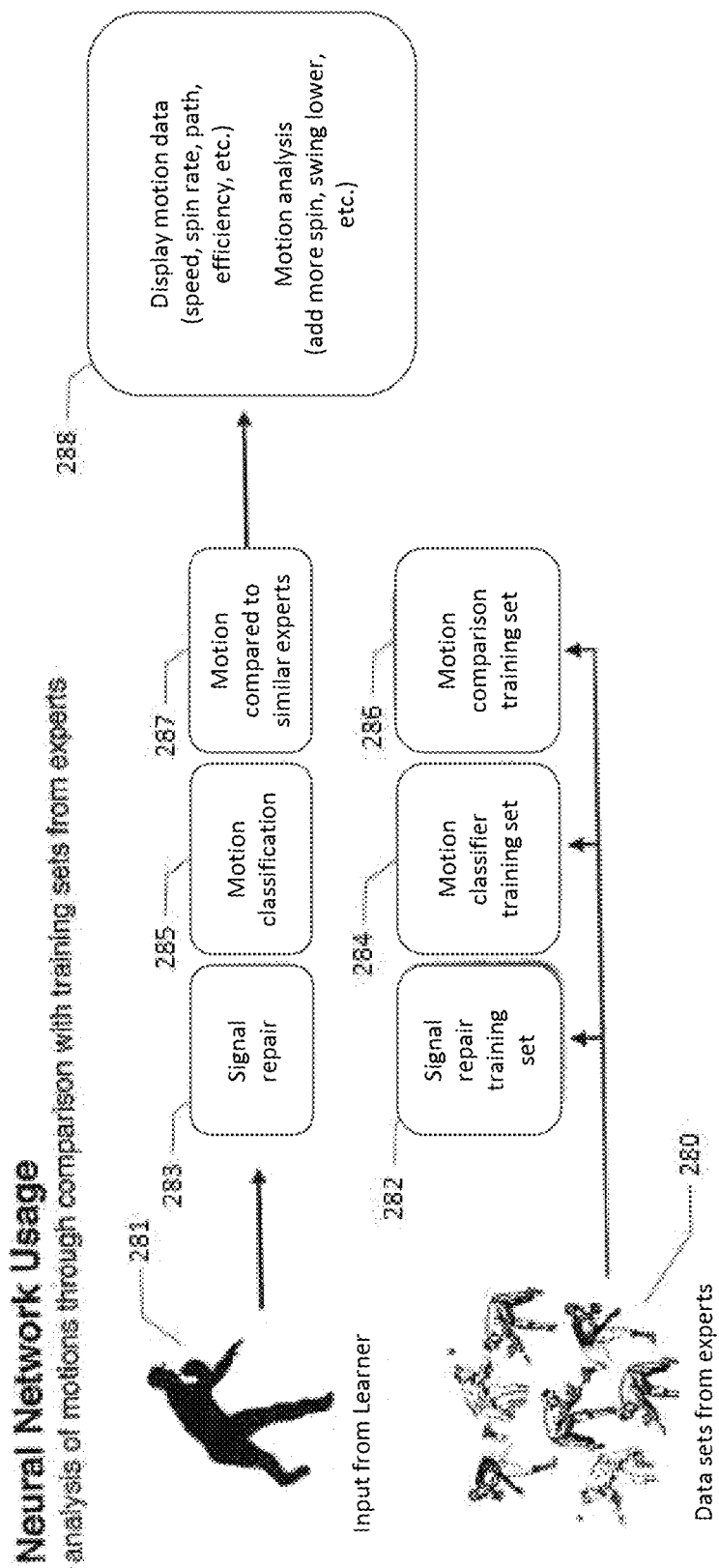
Figure 5:
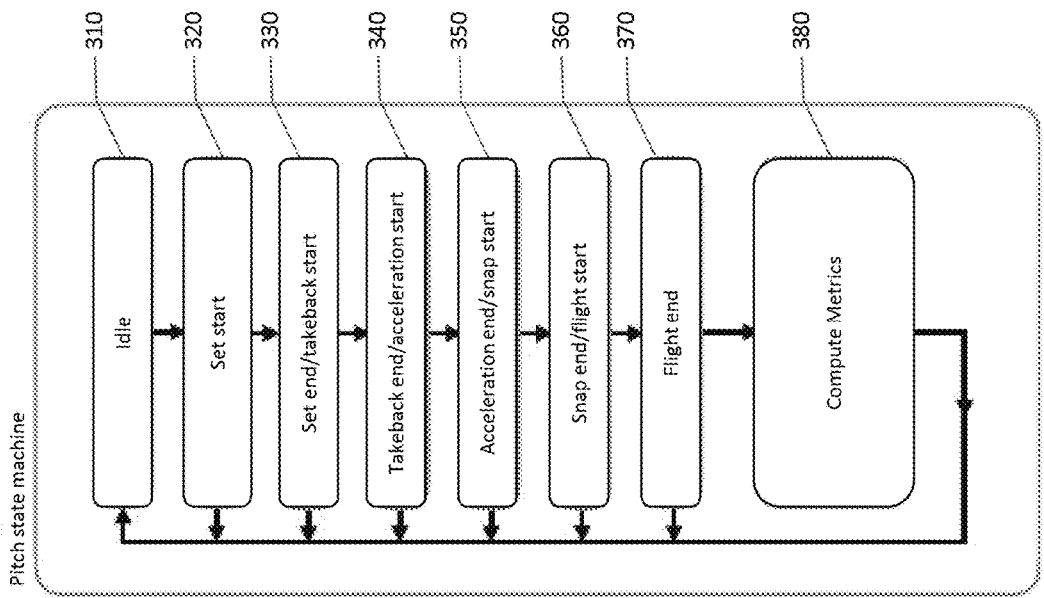
Figure 6:
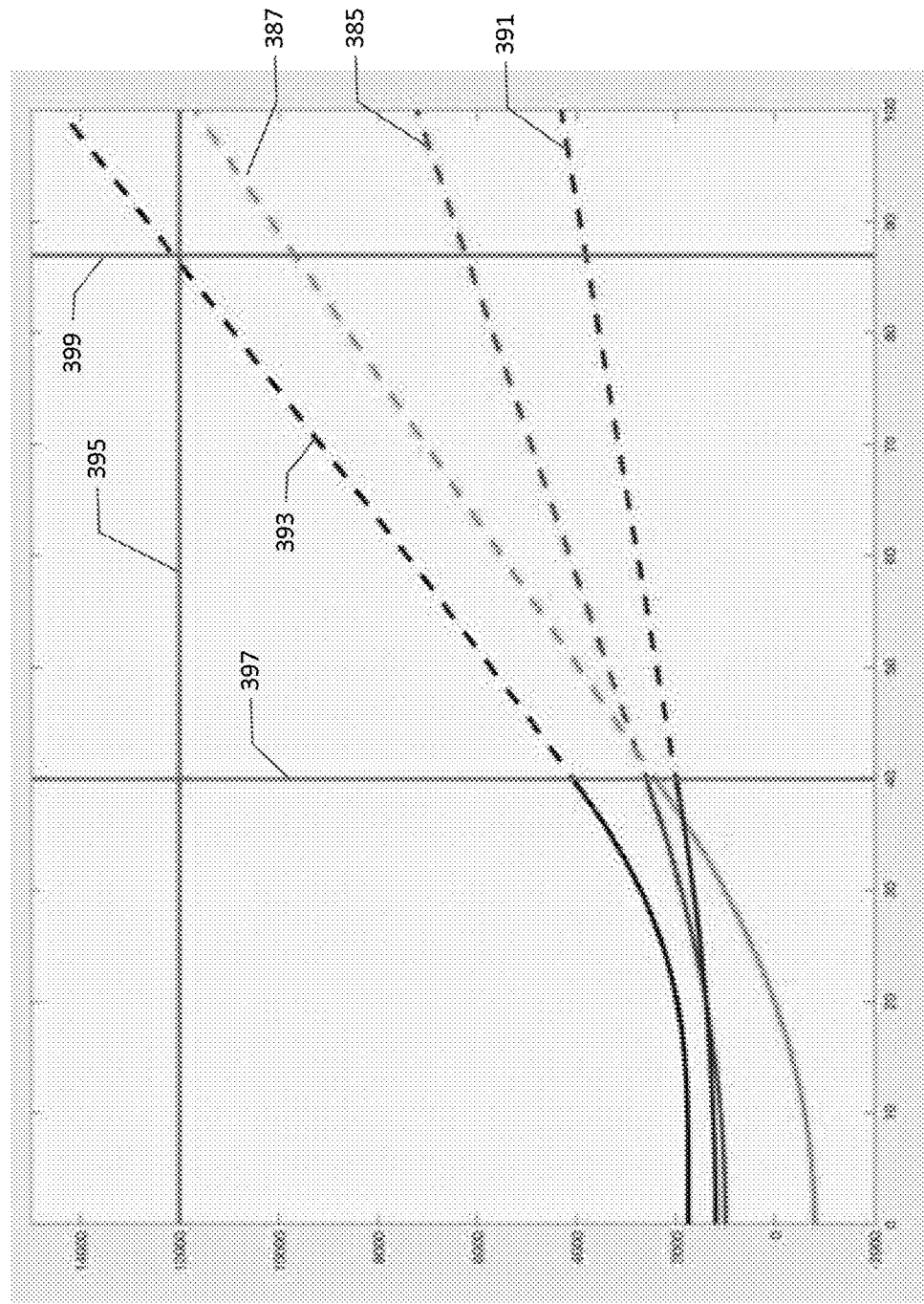
Figure 7:
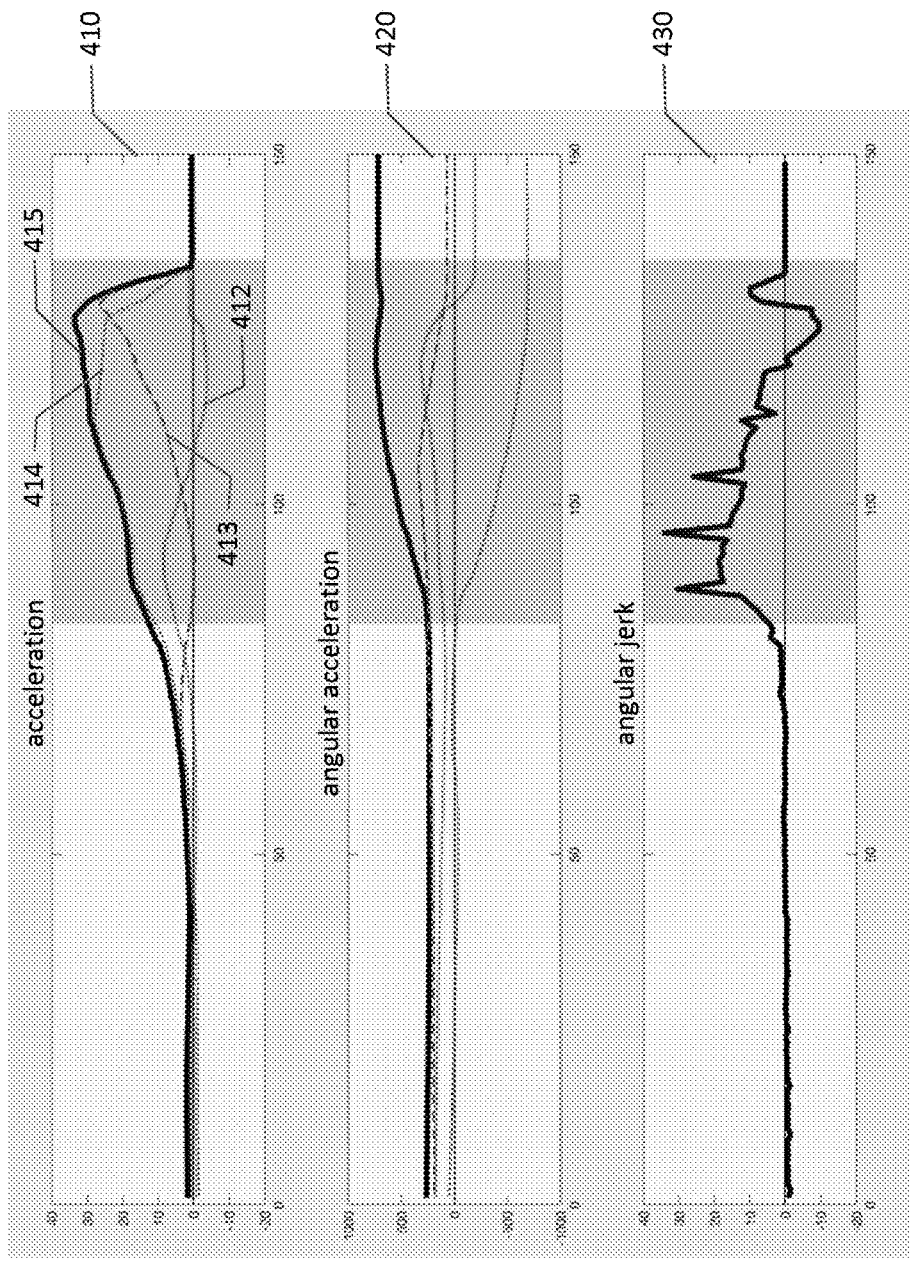
Figure 8:
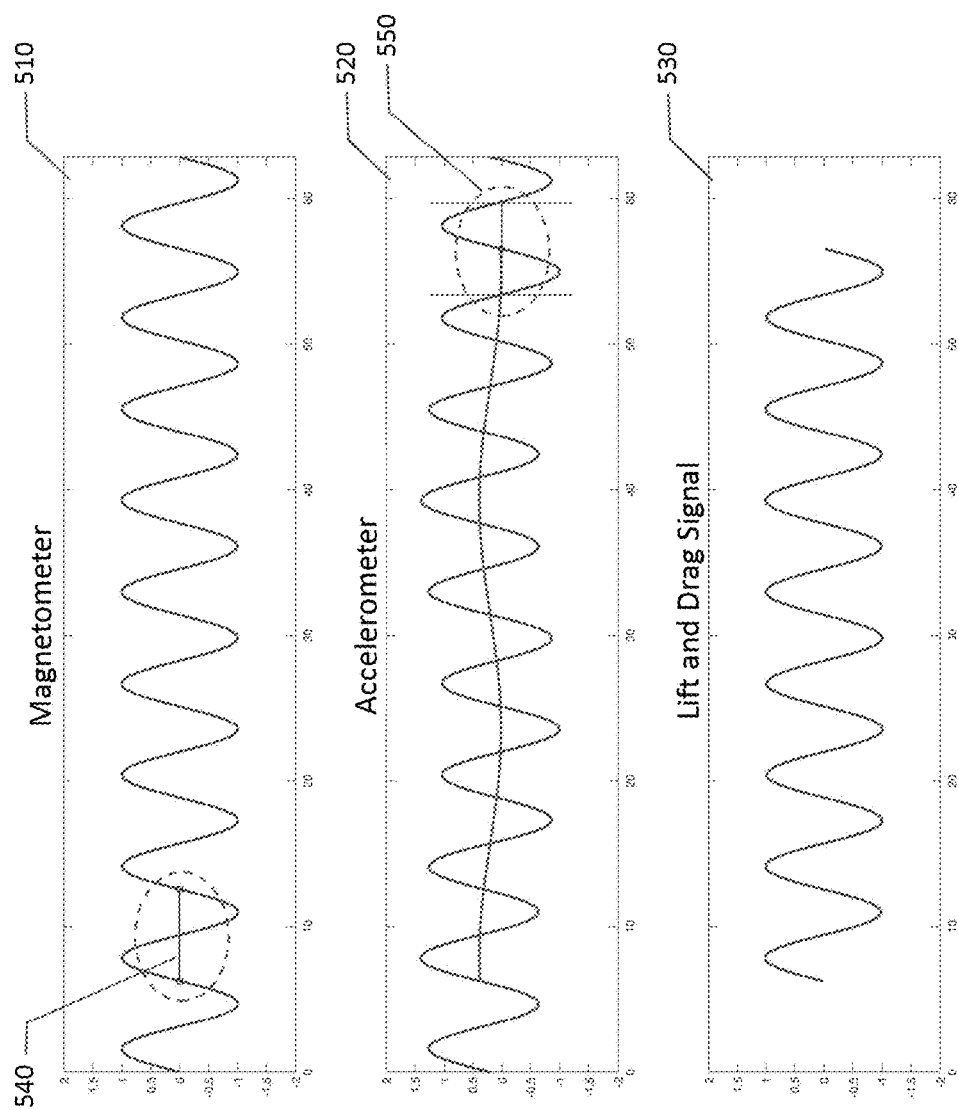
Figure 9:
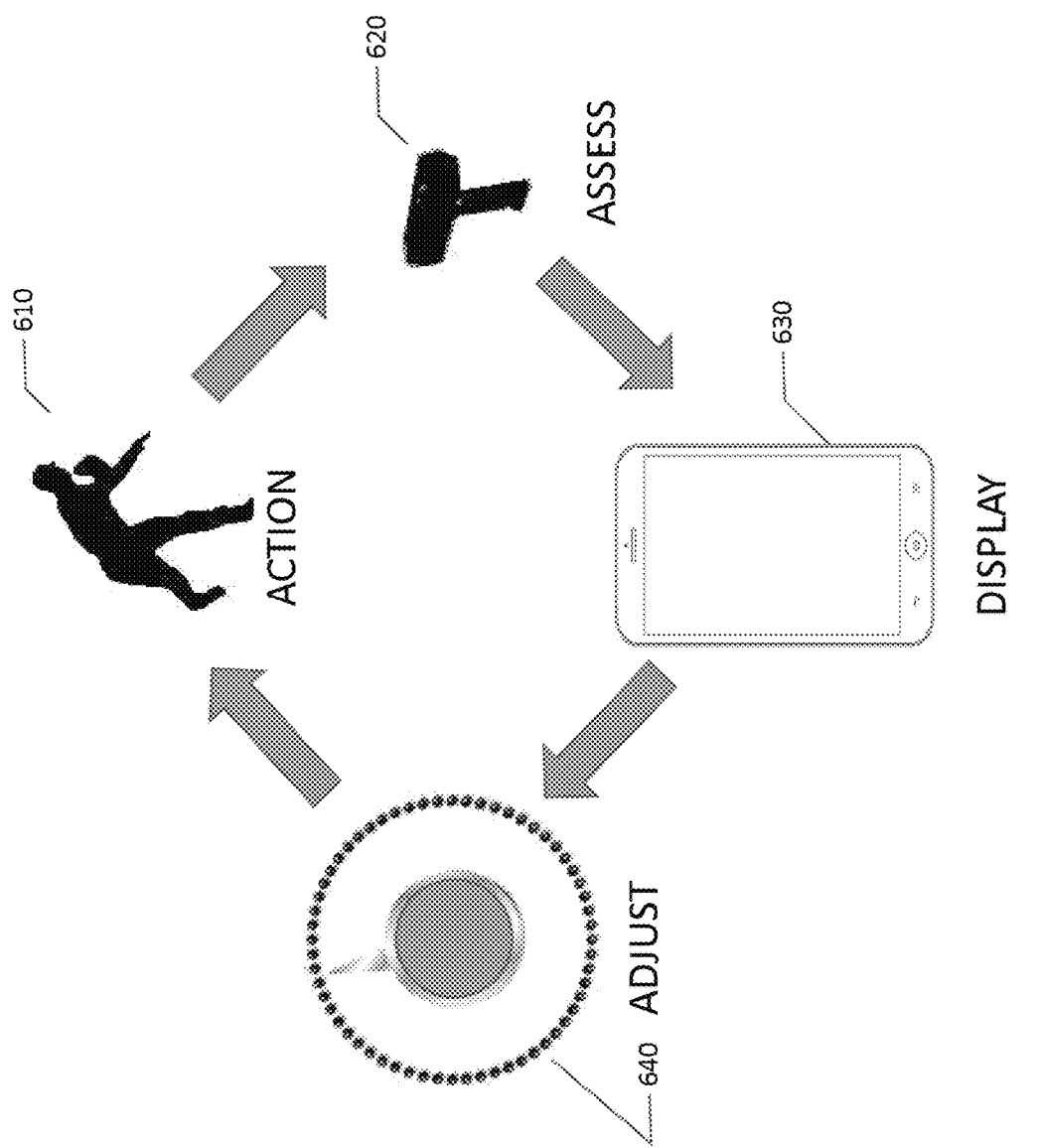

Having thus described example embodiments of the invention in general terms, reference will now be made to the accompanying drawings, which are not necessarily drawn to scale, and wherein:

FIG. 1 illustrates a block diagram of an apparatus that may be specifically configured to measure and process athletic actions performed on an object according to an example embodiment of the present invention;

FIG. 2 illustrates a motion engine for processing data from the motion sensors according to an example embodiment of the present invention;

FIG. 3 is a plot of an accelerometer signal from an object during a strike from a moving object, such as a baseball off of a tee, according to an example embodiment of the present invention;

FIG. 4 is an illustration of the implementation of various neural networks in conjunction with measuring and processing actions performed on an object according to an example embodiment of the present invention;

FIG. 5 is a flow diagram of the process for measuring the different phases of a baseball pitch according to an example embodiment of the present invention;

FIG. 6 illustrates the calculation of the spin of a ball once a gyroscope of the ball reaches an over-range condition according to an example embodiment of the present invention;

FIG. 7 is an illustration of the acceleration, angular acceleration, and angular jerk signals produced or derived from sensors of an object according to an example embodiment of the present invention;

FIG. 8 illustrates a series of plots of the sensor signals from an object during an athletic action according to an example embodiment of the present invention; and FIG. 9 is a flow diagram of the closed-loop method of training or coaching using example embodiments of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

While embodiments described herein may be implemented in a variety of form factors in a variety of systems to analyze the actions of athletes in many sports, a primary example embodiment will herein be described with respect to a thrown baseball. The action of pitching a baseball is highly complex and involves many intricate movements to affect the speed, spin, spin axis, and path of a baseball, such that systems capable of analyzing and providing feedback with respect to a baseball pitch are readily suited to various other sports and athletic actions which may be of similar or lower relative complexity. Embodiments of the present invention use a unique motion capture system to measure characteristics of a baseball during the different stages of a pitch. A baseball pitch involves various phases summarized as a wind-up, release, pitch flight, and catch. Each of these stages involves unique motions that, through analysis, can be used to improve various qualities of a pitcher's motion and delivery.

Most existing motion capture systems for capturing the flight of a baseball use external cameras and/or sensors, and may include sensors embedded within the baseball or worn by a pitcher. These systems can be intrusive and distracting to a pitcher, and may cause the quality of the pitch or reliability of the pitcher's motion to be degraded, which diminishes the value of the data acquired as it may cease to accurately represent the pitcher's conventional wind-up and delivery. Motion sensors attached to a pitcher's body or clothing can change the feel of the pitcher's arm or body, and may encumber the limbs of a pitcher or change weight distribution of a pitcher's arm. Any external factor that influences a pitcher that is inconsistent with their environment during a baseball game may affect the pitcher's wind-up and delivery, and may limit the benefit of analysis of a pitch. Embodiments described herein are realized without negatively impacting a pitcher or their environment, and can be used in an environment that may mimic pitching practice or game time environment, thereby improving the reliability and accuracy of the data gathered from the pitcher's wind-up and delivery of a pitch. As embodiments described herein may be implemented with substantial transparency to a pitcher, the system and methods should have no adverse impact on the performance of a pitcher using the system.

Embodiments described herein use a baseball that has a suite of sensors embedded into the ball to function as motion sensors in detecting the motion of a pitcher and the pitcher's arm from the beginning of the wind-up to the release of the ball, and to measure characteristics of the flight of the ball resulting from the pitcher's motion and release once the ball leaves the pitcher's hand. Embedding the sensors within the ball in a manner that maintains the feel of the ball, the weight of the ball, and the appearance of the ball may allow the pitcher to perform without any outside influences that may impact their pitching performance. Embodiments described herein may be transparent to a pitcher in that they may not be aware or be able to distinguish between throwing a baseball including the embedded sensor array and a regulation baseball. This may enable a pitcher to more accurately replicate practice, warm-up, and game time pitching motions and delivery both through a lack of physical encumbrances and indications, and also through psychological effects that may be present when a pitcher is made aware of the monitoring and measuring of their intricate movements.

While embodiments described herein are primarily directed to an instrumented baseball and measuring the parameters of the wind-up and delivery of a baseball pitch, embodiments may be implemented in other sports equipment, such as footballs, soccer balls, cricket balls, jai lai balls, etc., or used in equipment such as a golf club, baseball bat, or the like.

According to an example embodiment described herein, a system may include an instrumented baseball having an array of sensors discretely positioned within a core of the baseball, a means for transmitting the data from the array of sensors to an external device, and data storage means, which may include a memory attached to the sensor array of the baseball for storage and caching of pitch data, a memory on within the external device, a cloud-based storage system, or the like.

An instrumented baseball according to the present design may function as a motion sensor for detecting and measuring the movements of a pitcher while the ball is held by the pitcher, and the sensor array may become a flight data sensor once the ball has been released by the pitcher. Further, critical motions of the pitcher in the moments immediately before release of the ball during the pitch may be measured and analyzed to provide valuable feedback to a portion of a pitch that has historically been difficult to analyze or coach due to the speed with which a pitch occurs and the relatively short duration of the moment immediately before a baseball is released from the pitcher's hand. Once this data is measured by the instrumented baseball, the data may be transmitted and analyzed such that various aspects of the pitch wind-up, delivery, and flight may be presented to a user for review.

Instrumented Object

A device according to example embodiments may be implemented using a set of micro-electrical-mechanical systems (MEMS) sensors mounted on a printed circuit board (PCB) with a processor and a communications device, such as a radio, Bluetooth, RFID, or other communication device that would be compatible embodiments described herein. The communication system may be configured to transmit data from the sensor array and processor to a user device, where the user device may process the sensor data in cooperation with a neural network. The processing of the sensor data may be performed on the user device, processed remotely via server or cloud-based system, or a combination thereof. Optionally, the sensor array and processor may be configured to perform preprocessing functions of the sensor data and neural network communication functionality could be incorporated into the device processor and memory.

A method, apparatus, and computer program product are provided herein in accordance with an example embodiment for processing data from an instrumented object to determine objective qualities of the object, and using the data analysis in closed loop feedback to improve the use of the object. In a primary embodiment described herein, the object is a baseball which is instrumented to measure data during a pitch including the pitching motion of the pitcher and the path, velocity, spin rate and spin axes of the pitch. FIG. 1 depicts a communication diagram for an instrumented apparatus 100, such as a baseball. As shown, the apparatus 100 may include a processor 110 or central processing unit (CPU) for receiving signals from a plurality of sensor elements in a sensory array. The sensor array may include a gyroscope, such as a three-dimensional gyroscope 120, an accelerometer which may be a three-dimensional accelerometer 130 or an array of accelerometers to produce accelerations in a three dimensional field, and a magnetometer which may also be a three dimensional magnetometer 140. While the term gyroscope is used herein to describe a sensor or sensor array capable of measuring angular velocity, one of ordinary skill in the art would appreciate that the gyroscope may optionally be referenced as a gyrometer or device of similar capabilities. It is appreciated that while each of the sensors illustrated in FIG. 1 depict sensors that are compatible with three dimensional readings, it is understood that sensor arrays of sensors may be used to measure acceleration, orientation, or magnetic field in each dimension using single-axis sensors arranged in a complementary manner, for example. The processor 110 may optionally be in communication with a memory 160 and a communications interface 150, depicted as a Bluetooth communications interface in FIG. 1. The apparatus 100 may further be configured with a battery or other power supply configured to power the sensors, processor, memory, and communications interface within the baseball to enable a fully self-contained sensor array. Embodiments may include a wireless charging mechanism to charge the power source for the apparatus, such as the wireless charger 170 and voltage regulator 180 of FIG. 1.

In an example embodiment, the processor may be configured to execute instructions stored in memory 160 or otherwise accessible to the processor. As such, whether configured by hardware, software, or a combination thereof, the processor may be capable of performing operations according to an embodiment of the present invention. The communications interface 150 may be any means such as a device or circuitry embodied as hardware and/or software that is configured to receive and/or transmit data to/from the apparatus, such as to facilitate communications with one or more user devices. In this regard, the communication interface may include an antenna and supporting hardware or software for enabling communications with a wireless network. The communication interface 150 may be configured to communicate via near-field communication (NFC) protocols, such as Bluetooth (as illustrated), WiFi, Zigbee, RFID, or the like.

Motion Engine

The hardware described above and illustrated in FIG. 1 may be one example of an instrumented object such as a baseball for which data may be collected. A motion engine may be responsible for generating the streams of useful information about the object using hardware such as that illustrated with respect to FIG. 1. According to an example embodiment, the data from the sensors (e.g., acceleration sensor 130 and gyroscope 120) may be processed before it can be used. The motion engine described herein may provide this processing to enable functionality as described below. The motion engine may output the orientation of the object in the Earth frame of reference in quaternion form, the spin rate, the spin axis, velocity, and position. The motion engine may also output jerk and angular jerk, described further below, in the Earth frame. In order to transform the sensor data to acceleration and rotation data in the Earth frame, a vector rotation of the data may be performed from the object (e.g. baseball) frame of reference into the Earth frame. To facilitate the rotation, the motion engine may maintain the orientation of the object in the Earth frame. The orientation relative to the sensor frame is maintained in quaternion form and may define the rotation operation on the sensor data into the Earth frame.

Maintaining the orientation vector to correlate the Earth frame to the object frame may require the motion engine to fuse together data from the accelerometer and the gyroscope. When the object is at rest, the orientation of the object can be read directly from the acceleration data stream since the Earth acceleration of gravity is constant. As the object begins to move, the acceleration data contains the sum of the gravity vector and the acceleration caused by motion and thus is no longer useful itself. When in motion, the orientation may be maintained by integrating the rotation of the object as measured by the gyroscope.

FIG. 2 illustrates a process flow diagram of an example embodiment of a motion engine as described herein. As shown, acceleration data is generated by the acceleration sensors at 205 and angular velocity is received from the gyroscope at 210. The two sensor streams are controlled by the Set Detector 215 by monitoring the streams of sensor data from both inertial sensors. Using this data, the Set Detector outputs a signal that indicates when the acceleration stream represents the gravity vector. This signal is used to initialize the orientation quaternion and reset all of the integrals maintained by the motion engine as shown by the dotted line from sensor fusion 220. This calibration step allows the instrumented object to be re-zeroed before each measurement operation, such as before each pitch of an instrumented baseball.

The motion engine operates in two different frames of reference. The ball frame and the Earth frame, where the ball frame of reference moves with the ball, while the Earth frame of reference remains constant. The coordinate system from the ball frame of reference is derived from the three-dimensional sensors which define an X, Y, and Z framework that is fixed in relation to the orientation of the instrumented assembly. The coordinate system of the Earth frame is defined by the gravity vector, which defines the Z axis of the Earth frame. The X-Y plane of the Earth frame is orthogonal to the Z-axis but the orientation of the X-Y plane is fixed azimuth, which may be in an arbitrary manner. For instance, the Y axis may be aligned with a magnetic north if a compass is available, though "north" does not necessarily have to align with the Earth's magnetic field if a compass is not available.

As illustrated in the example embodiment of FIG. 2, the sensor data from the accelerometer and the gyroscope are aligned to the Earth frame of reference using the Set Detector 215 and the Orientation Quaternion 235 through sensor fusion at 220. Using the Earth frame of reference relative to the object/ball frame of reference, vector rotation of the sensor data is performed at 225 for the acceleration sensor data, and 230 for the angular velocity data from the gyroscope. This correlates or aligns the ball frame of reference to the Earth frame of reference, allowing the motion detected in the ball frame of reference to be interpreted by a user as described further below. The acceleration sensor data provides acceleration in the Earth frame of reference based on the rotation at 225 as shown at 240, and through integration at 245 provides velocity at 250, and through further integration at 255 provides position at 250. The angular velocity data through rotation to align with the Earth frame of reference at 230 provides angular velocity 265 in the Earth frame of reference, and through a derivative at 270, provide angular acceleration at 275.

The motion engine is thus able to process raw signal data to arrive at acceleration, velocity, position, angular velocity, and angular acceleration in the Earth frame of reference. This allows the tracking of an object, such as a baseball, through space and time to obtain rates of rotation about axes aligned with the earth to produce a full set of measurements of a pitch from wind-up through delivery including the tracking of the object during aerodynamic flight. By aligning the ball frame of reference with the Earth frame of reference, the measured motion of the ball may be tracked relative to the pitcher's mound and home plate during a pitch, providing an easily interpreted data set about the pitch. This unique methodology is essential to provide the tools necessary to train and coach various aspects of an action such as a pitching motion.

Data Processing

Embodiments described herein may use an instrumented baseball as described above to measure and quantify the performance of a pitcher and evaluate various aspects of a pitcher's motion and the pitch itself. A baseball pitch requires a complex series of motions from a pitcher involving the entire body of the pitcher, and particularly the arm of the pitcher. These motions happen very quickly, and a baseball delivered from a baseball pitcher may reach speeds in excess of 100 miles per hour. Due to the complex nature of the motion of a pitcher during the wind-up and delivery of a pitch, and the speed with which a pitch is thrown, sensor data attempting to capture this motion may be vulnerable to missing data or gaps in the data. Processing of data from an instrumented baseball may also be vulnerable to missing data and algorithms used to process the data may fail when data gaps preclude accurate analysis of the motion data. Inaccurate data or timing differences between sensors within a sensor array of an instrumented baseball may result in data that is imperfect, and may historically be difficult to analyze. Embodiments described herein provide a method of using a sensor array including relatively low-cost sensors, which generally may be more susceptible to data issues, to obtain accurate and repeatable results despite potential issues with the generated data that would be detrimental to conventional data processing algorithms.

As outlined above with respect to the motion engine, the sensors used may provide raw data that is processed and transformed into useful data in the Earth frame of reference to include data regarding the pitching motion and the free flight of the ball after release by the pitcher. Methods described herein may capture a stream of data from the sensor array that is monitoring the body in motion and provide that data stream to a processor and motion engine. The processor may use a neural network and a database of motion data to derive the required information in order to process the data stream. Optionally, the data may be pre-processed within the object, such as within the processor 110 of FIG. 1 performing the motion engine calculations of FIG. 2, in order to limit the bandwidth of data produced and transmitted by the communications interface 150. Methods may process data that includes gaps and/or inaccuracies in the data set due to real-world influences such as the motion exceeding the dynamic range of a sensor, poor calibration, inadequate capture rates, etc.

While some relatively high-cost sensors may be able to avoid some issues related to data capture, high-cost sensors may limit the viability of a product and may be detrimental to product accessibility. Conversely, low-cost sensors may reduce the cost to manufacture a product if the sensors can be reliably used for their intended purpose. Embodiments described herein solve problems associated with low-cost sensors by mitigating their deficiencies through data processing and intelligent data repair to enable processing of data streams that may be less than ideal. Methods provided herein remove the vulnerabilities of low-cost sensors and are tolerant of missing data, inaccurate data, or timing differences between samples from various sensors. This allows a high quality set of measurements to be obtained from a low-cost sensor or under-functioning sensor set.

According to example embodiments, an array of sensors of various types may be embedded within a baseball or other object of sports equipment to produce one or more streams of data that correspond to the motion to be measured. A signal processing chain may be used to limit bandwidth, control sensor gain, etc. A filter may be used to establish the beginning and end of the desired motion or phase of motion. The captured data may be filtered by a trigger function and transferred to a processor, such as a neural processor. A neural network may be used that is trained by a database of similar data to process the data set and produce the desired measurements. The resulting data may be provided for display, storage, collation with other users, or providing metrics for analysis by one or more users. The neural network and database may reside within a user device configured to receive signals from the sensor array disposed within the baseball, or may be located on a server accessed via network, or part of a cloud-based processing system. Optionally, the sensor array may be configured to process the sensor array data in whole or in part before transmitting the processed sensor data to a user device or network for further analysis.

Sensors of example embodiments may be configured to sample data at a high rate, such as a substantially continuous data stream or sampled at a high rate, such as two thousand samples per second. The samples may then be bandpass filtered and gated by a trigger logic before transmission to a user device. The samples may be stored in a local buffer collocated with the sensor array for delayed transmission. Optionally, embodiments may be configured to continuously stream data to the user device or the cloud. Once the data is sent to a user device, the user device or a separate device may display the data in its received form, but may also transfer the data to the neural network processor. The neural network processor that has been previously trained with relevant data may transform the data received from the sensor array into a desired set of measurements. The measurements may then be sent back to the user device for storage, display, collation, etc.

The neural network component described herein may be used to develop a high quality signal from the data received from the signal array. FIG. 3 illustrates an example embodiment of the output from one channel of an accelerometer during a strike to an object by a player, such as a baseball on a tee being struck by a bat. While the illustrated embodiment of FIG. 3 relates to a baseball on a tee, it is understood that the same methodology and instrumentation may be implemented in a variety of sporting equipment, such as a baseball or golf ball as described in other example embodiments herein. The accelerometer may be embedded in the object much in the same way a sensor array may be embedded within a baseball. As shown, the first frame of the strike of the object has an invalid reading due to the acceleration during the first one millisecond being much larger than the range of the embedded accelerometer. A digital signal processing approach may use a low-pass filter to fill in the missing data, though the resultant value would be too high, and other features within the signal may be attenuated by the filter. This will cause any derived data, such as the speed of the object from an integration, to be severely compromised and unreliable. A digital signal processing system could repair the signal with an interpolation which would under-represent the value and also compromise the data for use in downstream calculations. However, using a neural network as described herein may reliably replicate the missing sensor data and provide an accurate model of the actual movement.

As shown in FIG. 3, the chart illustrates the output of an accelerometer from an object struck by a moving object, such as a baseball on a tee. At time zero the object is at rest, and then struck at five milliseconds (impact). Immediately following the impact, the accelerometer goes beyond its range temporarily, and returns to within range by seven milliseconds. The acceleration curve illustrates that the object remains in contact with the baseball bat until thirty four milliseconds, as there is still positive acceleration. After thirty four milliseconds, the object enters "free flight". A neural network can fill in the missing accelerometer values between five and seven milliseconds by identifying similar impact curves, the strike phase of the signal, and knowing the valid range of acceleration of the type impact. This information may be fed to the neural network as training data through a plethora of previously performed impacts using instrumented objects. The techniques described herein are especially useful with an instrumented ball or similar object of unconstrained motion as angular acceleration and spin may complicate the overall data stream from the instrumented object. An inertial tracking algorithm, such as an inertial measurement unit (IMU) can separate the various forces into a coherent set of vectors in the Earth frame of reference. Missing or corrupted data can disrupt this process and introduce considerable error in the output.

A neural network as used herein may be trained with thousands of examples of baseball pitches that embody a physical model of the system over a broad range of conditions. In this case, the shape of the overall accelerometer signal, along with other inputs in the system, may cause the network to closely classify the signal into a narrow range of impact scenarios, and possible values for the missing data may be tightly constrained automatically. This enables the system to fill in missing data or to detect incorrect samples with relative ease. Using the neural network, the sensor data may be made whole to produce a high quality sample set for analysis and further computation.

The aforementioned method may be applied to a wide range of motion signals. Most motion systems, such as striking a ball, throwing or swinging motion, gait, flight motion, impact motion, etc. may be highly constrained. The motion is either a smooth continuous function or contains a single step function followed by smooth, continuous function. In general, the weights and sizes of the bodies in motion may fall within a narrow range of values, and the accelerations and speeds also fall within a range that is specific to that scenario. For instance, a baseball pitcher must throw the ball no less than 30 miles per hour to reach the batter and player physiology limits the maximum speed to less than 100 miles per hour in 99.9% of pitchers. These small ranges enable a neural network to embody a broad training set with manageable storage and processing capabilities.

Another layer of the neural network may use the repaired signal data to judge the quality of the motion by the outcome or by a comparison to similar motions by experts in the same field. The outcome of a baseball pitch may include, for example, a distance thrown, accuracy, spin axis, etc. The neural network may be able to find appropriate cases for comparison, and then highlight the differences that make the example case superior to the input case.

As described herein, the use of neural networks can mitigate key weaknesses in digital signal processing systems. A neural network can process an entire dataset from a sensor or array of sensors simultaneously and can avoid disruptions typically caused by discontinuities in the signal. In the field of sports training and assessment, a wide array of methods may be used to measure human performance and resultant sports object performance, such as a thrown ball. The sensors that are used to measure the aforementioned performance are often unable to measure the full range of motion and sections of the data set may be missing or inaccurate. Embodiments described herein mitigate those issues and enable the use of relatively low cost sensors to perform measurements and produce meaningful data.

The neural network processing described herein may fill in the missing gaps and minimize error in the data set. The restored data set may be useful in training, assessment, and measurement of performance. This processing paradigm is not vulnerable or susceptible to gaps or discontinuities in the sensor data and can extract information from a data set that may not be directly available. After training the neural network using many examples of similar actions, the neural network can process based on assumptions with high confidence. The neural network can produce accurate information without a direct measurement. Further, as additional data is collected and added to the neural network, the neural network learns and develops in such a way as to improve accuracy and reliability of the data interpolation necessary to overcome deficiencies in sensor readings.

Traditional signal processing methods may extract useful information, but struggle with discontinuities in the data set. An example may include when a ball is struck by a bat, the translation vector of the ball is reversed. For many algorithms, the signal pipeline is effectively flushed and processing starts without any samples. In other words, the algorithms cannot process seamlessly through key events. The implementation of neural networks described herein eliminates or mitigates this key weakness of digital signal processing systems through an elimination of the data pipeline, and instead uses a neural network to process the entire data set simultaneously without disruption from discontinuities.

In practice, a neural network is generated with many examples of similar motion data constructed with similar data sets. When the desired motion is detected, such as a wind-up and delivery of a pitch, a data set is collected from an array of sensors to include a set of frames, each with a complete set of measurements. The data set may then be presented to the inputs of the neural network, and the outputs of the neural network present the desired extracted data.

Neural networks provide a means to encode massive sets of data from thousands of similar data sets, such as similar motions of a baseball pitch. In an example embodiment described herein, a neural network may be trained with thousands of datasets from baseball pitches. The data from a new baseball pitch (or any other motion) may be presented to the inputs of the neural network. The neural network may then be able to set its outputs to the proper values based on the patterns in the training set.

FIG. 4 illustrates an example embodiment of neural network usage through comparison of motion with training sets from known-good examples such as from experts or professionals in the field. In the first step, data is collected from experts at 280 or developed from computational models or robotic (machine learning) systems. Many thousands of data records may be needed for a model of higher accuracy and a wide range of motion types may be needed, such as motions for curve balls, sliders, slap shot, chipping, driving, etc, in order to appropriately classify and quantify measured data from a user. The database is then used to train neural networks for each stage of the process. The first neural network is used to fill in or correct signal data from the sensor at 282. Because low-cost sensors may drop data or corrupt data, it is beneficial to filter and/or enhance the signal to restore fidelity of the signal during signal repair 283 of the learner's data gathered at 281. The next step determines the type of motion in the data set. A second neural network 284 may be used for this process. The output of the motion classification 285 may be used to select which features of the motion are most relevant to the learner. The third neural network 286 compares the relevant features of the learner's motion to the expert or ideal motions in the training set at 287. This information is used to give guidance to the learner at 288 to more closely match the motions in the training set and improve the learner's performance.

Gyroscope Over Range

The aforementioned description includes spin rate measurement using a gyroscope. However, during the Snap phase of a pitch which is the finite period of time immediately before release of the ball and free flight begins, as described below, the spin rate of a baseball rapidly increases. For most pitch types, the spin rate will continue to increase until it exceeds a measurement range of the gyroscope. A gyroscope may have a defined bandwidth over which recorded spin rate is accurate, and above or below this defined bandwidth the recorded spin rate may suffer from a degradation in accuracy. Embodiments described herein enable spin rate to be determined more accurately beyond the defined bandwidth over which a gyroscope is accurate. For some gyroscopes, the upper limit of the bandwidth may be around 667 revolutions per minute (RPM). During the last moments of the Snap phase of a pitch, the rotational velocity may be greater than 667 RPM such that the gyroscope cannot accurately report the spin rate of the ball. This time period of the pitch is where the gyroscope is over range or out of range.

Embodiments described here compensate for the loss of valid gyroscope data during the final moments of the Snap phase of a pitch. In order to make this estimation, an assumption may be made that the ball will be in an over-range condition late in the Snap phase of the pitch. At this point in the Snap phase, final spin has been imparted on the ball by a pitcher as it is leaving the pitcher's hand, and the pitcher is unable to change the direction of the torque that they are applying to the ball. The direction, but not necessarily the magnitude of the torque vector is assumed fixed relative to the Earth frame, such that the direction of the angular acceleration vector is also fixed.

During the period of the pitch prior to the over range condition, the angular velocity and angular acceleration of the ball are known in the Earth frame as described above. This data is generated by the motion engine. At the start of the Flight phase following the Snap phase, the total spin rate or the magnitude of the spin vector may be determined using a measurement from the magnetometer. The total spin may be derived from the magnetometer; however, other methods are available, such as deriving the spin rate from the centripetal force or frequency analysis of the accelerometer signal. Based on the available sensor data, the measurements at the beginning of the over range period are known and a partial set of measurements are known at the beginning of the flight phase. Using the last valid angular velocity and angular acceleration vector immediately preceding the over range condition, and the known total spin rate at the beginning of the Flight phase, the angular velocity vector can be extrapolated. Although the magnitude of angular acceleration changes, the solution described herein is not affected by the fluctuations in magnitude. For example, if the magnitude were reduced by half, it would take twice as much time to reach the final spin rate. However, the components of the spin would be the same. The solution may be modeled as if the magnitude were fixed. The time computed as part of this solution may not represent the actual time it takes for the ball to reach its final spin rate. The time is representative of how long it would have taken if the magnitude were fixed.

The equations presented herein can be solved in order to find the components of spin at the start of the flight. Where:

ωx(flight)=x component of spin at the start of flight (earth frame)

ωx(0)=x component of spin at the start of over range (earth frame)

αx(0)=x component of angular acceleration at start of over range (earth frame)

totalSpin=the magnitude of the angular velocity vector at the start of flight tRise=time it would take to reach the final spin rate if angular acceleration is constant Spin rate may be calculated by the following:

$$\omega x(\text{flight})=\omega x(0)+t\text{Rise}*\alpha x(0)$$

$$\omega y(\text{flight})=\omega y(0)+t\text{Rise}*\alpha y(0)$$

$$\omega z(\text{flight})=\omega z(0)+t\text{Rise}*\alpha z(0)$$

$$\text{totalSpin}=\text{sqrt}(\omega x(\text{flight})^2+\omega y(\text{flight})^2+\omega z(\text{flight})^2)$$

FIG. 6 illustrates a graphical representation of this process, where curve 385 illustrates the X-component in the Earth frame, curve 387 illustrates the Y-component in the Earth frame, and curve 391 illustrates the Z-component in the Earth frame. Line 395 represents the total spin rate of the ball in flight, where the solid portion of each curve represents a measurement rotated into the Earth frame of reference with the gyroscope. The curve 393 represents the cumulative spin rate of the ball. Vertical line 397 represents the start of the over range condition, while vertical line 399 represents the solution to the system of equations, where each dashed line can be evaluated to give the three components of spin. The dashed portions of each line represent the fixed angular acceleration model ωx(flight)=ωx(0)+tRise*αx(0).

Using the aforementioned technique, the spin imparted to a baseball may be reliably and repeatably calculated using extrapolation of data from the motion engine described above even after the gyroscope sensor has exceeded its useful range. This allows for comprehensive analysis of a pitch from the beginning of wind up through delivery in a manner that is accurate and not previously achievable.

The spin rate of a ball may also be established based on signals from a magnetometer. The period of a sinusoidal signal may be interpreted as the spin rate, and may be established based on three channels of data (e.g., from three orthogonal axes) by establishing which channel exceeds a minimum peak to peak signal value and finding the zero crossings within each signal. The time difference of two adjacent pairs of zero crossings may then be averaged to determine the period of the spin or spin rate.

Measurement of Performance

As described above, embodiments of the present invention provide a means to measure a person's performance, such as the pitching of a baseball. Embodiments use an array of sensors to measure the throwing mechanics of a pitcher, and also to measure the flight, spin rate, trajectory, and distance of the ball after it is released by the pitcher. Measurement of pitching mechanics and throwing performance may be instrumental in improving a pitcher's mechanics, rehabilitating a pitcher from an injury, or learning how a pitcher's body is moving throughout the wind-up and delivery of a pitch. The measured data may include the path of the hand of the pitcher while they are holding the ball, acceleration forces during the motion, impulse measurements, etc. From this information, other information relating to pitching mechanics may be derived, such as excessive twisting of skeletal joints, loads on muscles, etc. The embodiments described herein provide a means for making these measurements at a low cost with a high ease of use.

Methods described herein employ the signals from an acceleration sensor and an angular rate sensor to capture the motion of a person's hand during the throwing motion. The sensors can either be worn on the hand or embedded into a handheld object, such as a ball to be thrown. A collection of mathematical operations on these signals can be employed to derive important information about the motion during a pitch.

Existing methods for measuring throwing mechanics or measuring a thrown ball typically require calibration and extensive set up before they can be used. Further, the complex nature of existing systems results in a high cost of implementation together with a complex method of operation or set up that precludes widespread adoption of such systems in sports, particularly at grassroots levels where cost is typically a substantial concern. The system provided herein can be implemented at a relatively low cost and does not require substantial setup time or calibration. A user can quickly receive an accurate measurement of each pitch. The ease of use of the system described herein together with the low cost enables widespread adoption, which also facilitates the aforementioned neural network through the collection of crowdsourced data on pitches from a wide array of users.

Embodiments described herein include a sensor array within a ball as described above. The sensors may include an accelerometer and gyroscope (angular rate measurement) sensors and a processor with a power supply embedded within the ball. A wireless function may facilitate transmission of the measurements to the user via a user device. As the ball is thrown, the sensors may integrate the acceleration to obtain velocity and integrate the velocity to establish distance. The integrals for both values may start at the beginning of the throw when the hand is not in motion, and complete when the ball is no longer in contact with the hand.

As described above, an instrumented baseball may include a power source such as a battery, a processing element for receiving and processing sensor signals, an array of sensors which may include a three-axis accelerometer and a three-axis gyroscope, and preferably a wireless communications interface. The processing of the sensor data may be performed locally on the processing element of the sensor array within the ball, or performed remotely responsive to receipt of the sensor data. In either instance, an integration function may be applied to the sensor data to maintain orientation in space relative to Earth. The acceleration vector produced from the sensor data may be rotated into the Earth frame as described above with respect to FIG. 2. A velocity function may be implemented in local and/or remote processing to integrate the acceleration vector.

FIG. 2, described above, illustrates the data collection and processing flow of an example embodiment using the hardware illustrated in FIG. 1. According to the example embodiment, during the throwing motion, the sensor array may provide three dimensional signals for acceleration using an accelerometer 130, and angular rate using a gyroscope 120, and provide those signals to a processing element 110 which may implement the inertial measurement unit functionality to establish and maintain orientation of the ball relative to the Earth frame of reference and integrate the accelerometer signal to compute velocity, as shown in FIG. 2. The sampling may be performed substantially continuously or using a sampling rate that is sufficient to ensure accurate measurement throughout the pitch. The magnitude of the velocity may be used to compute the impulse value, given the fixed, predetermined mass of the ball.

In practice, an implementation of the example embodiment of FIG. 1 may begin with a user initiating the process by holding the ball with the embedded sensor array steady for a predetermined time period, such as ten milliseconds to signal to the inertial measurement unit to capture the orientation of the sensor relative to gravity (e.g., Earth reference frame). This is used to rotate the readings from the sensor from the "sensor frame" to the "Earth frame." This process will not generally interfere with the pitching process as many implementations may require a "set" or "address" which is a momentary stillness while the user assesses the throw or other aspect of the game. As the pitcher's hand begins to move, the inertial measurement unit integrates the gyroscope outputs to maintain orientation relative to the Earth frame as described above with respect to the motion engine. The accelerometer signals are integrated to track the velocity, and integrates again to track the path of the ball with the embedded sensor array through space. These values may be used in further computations and/or communicated, such as via the communications interface, to a user through a user device which may include a tablet computer, mobile device, laptop computer, or the like. The information relating to acceleration, rotation, velocity, and path for each sample period during the throw can be presented in various ways that may be meaningful to the pitcher, a coach, a medical professional (e.g., a sports medicine doctor or kinesiologist), or the like who may be trained to understand the effects of the motion on the human body and/or on the pitch itself.

Measurement of Snap Phase

A baseball pitch involves several phases from the beginning of the wind-up of the pitch through delivery and a catch of the pitch by a catcher. Those phases may include:

Set—brief pause at the beginning of the pitch

Takeback—motion of the hand from the pitcher's glove away from home plate

Forward—the hand moves forward along the intended path of the ball

Snap—the ball is released from the hand

Flight—aerodynamic flight of the ball moving toward home plate

Catch—termination point of the pitch

The "hand" as referenced above describes the hand holding the baseball during the pitch. The Set phase, Takeback phase, Forward phase, and Snap phase are each part of the wind-up before actual release of the ball. The different phases of the wind-up are important for different reasons, and the snap phase of the pitch is of significant importance to the path, spin, and velocity of a pitch. Embodiments described herein segment data relating to the pitch into different phases as key metrics may differ from one phase to another. For example, while arm and shoulder movement may be of critical importance to the Takeback phase and Forward phase, the arm and shoulder may not be as important during the Snap phase, where hand and finger movement may be of critical importance.

FIG. 5 illustrates an example embodiment of the progression of a pitch including an idle stage 310 which occurs before a "set" phase is detected. During the idle stage, a pitcher may be moving around the pitcher's mound or determining a pitch. Once ready to begin the pitch process, a Set phase is entered at 320. As noted above, this is a brief pause during the pitching process as the pitch motion is about to start. As the Set phase ends, the Takeback phase 330 starts as the motion of the hand from the pitchers glove pulls back. At 340, the Takeback phase ends and the Forward phase starts with acceleration toward home plate. As the Forward phase of the pitch is ending, the Snap phase 350 immediately preceding release begins, and at 360 the Snap phase ends at release and the aerodynamic flight of the ball commences. The flight of the ball ends at 370 when it is caught by a catcher, hits a backstop, hits the ground, or in a game scenario, hit by a bat. Once the ball flight ends, metrics are computed at 380 as described herein.

The Snap phase of the wind-up is of significance to a pitch as it is the phase where the ball is still in contact with the pitcher's hand, but the hand is imparting its final influence on the ball before release. The pitcher imparts nearly all of the spin and sets the spin axis of the baseball during this phase. Both the spin axis and the spin rate are important factors in the flight path of the ball. A pitcher establishes the type of pitch thrown using the grip of the pitcher's hand on the ball and how it is released during the Snap phase. This makes the Snap phase critical to learning a new pitch and improving an existing pitch.

The Snap phase is very important to the outcome of the pitch. The spin axis and spin rate are primarily established during the Snap phase. The spin axis and rate at the start of the Snap phase is the result of the motion of the pitcher's arm which may be relatively slow compared to the spin rate at the end of the Snap phase. The spin axis can transition to any orientation during the Snap phase. The Snap phase can add significant speed to the pitch and establish the final speed of the pitch before free flight. Embodiments described herein identify the Snap phase and isolate its influence on the outcome of a pitch.

Before the start of the Snap phase, the angular acceleration of the ball is limited to the motion of the hand of the pitcher, which is relatively low compared to the angular acceleration placed on the ball during the snap phase. Through monitoring the magnitude of the angular acceleration on the ball during the early part of the pitch, a sharp increase in the magnitude signals the start of the Snap phase. This enables embodiments described herein to distinguish between the Forward phase of the pitch and the Snap phase without relying on a visual observation of the pitcher's hand, but instead provides an identifiable measured parameter that signifies the beginning of the Snap phase. This method is more reliable than visual observation, particularly because hand position around a ball may change based on the grip and the pitch to be thrown, and establishing the beginning of the Snap phase visually may be impossible without numerous angles and highly accurate images of a pitch that would still require detailed analysis to establish.

The Snap phase of the pitch is completed when the ball is no longer in contact with the pitcher's hand and the ball commences aerodynamic flight. Embodiments described herein using measurements obtained through the hardware described above may establish the end of the Snap phase by monitoring the magnitude of the translating acceleration as opposed to the angular acceleration. During the Snap phase, the acceleration increases rapidly and subsequently drops to zero very quickly. When the magnitude reaches zero, the ball is no longer in contact with the pitcher's hand. Due to aerodynamic forces measured by the accelerometer as the flight phase is entered, it is not reliable to rely on the magnitude of the accelerometer exclusively. A more reliable signal can be derived by differentiating the accelerometer signal to obtain the "jerk" signal. The jerk signal will have an exclusively positive value during the start of the Snap phase, and exclusively negative value during the latter part of the Snap phase. This signal is a reliable indication of the start of the flight phase when the jerk signal approaches zero or even a small positive value, and the accelerometer signal becomes less than the maximum value expected by aerodynamic forces (e.g., deceleration due to drag).

FIG. 7 illustrates an example embodiment of signals generated by sensors and processing elements of the present invention. As shown in the top graph 410, acceleration forces on each of three axes of the accelerometer (412, 413, 414) and the magnitude 415 are illustrated. The middle graph 420 illustrates angular acceleration, while the bottom graph 430 illustrates the derivative of angular acceleration or angular jerk. The shaded portion of the graphs, between approximately 80 and 135 milliseconds, is the Snap phase identified according to the above-described signal analysis. During the first 80 milliseconds of the graphs of FIG. 7, rotation of the arm is present as the wind-up for the pitch occurs. Subsequently, a sharp change in the angular jerk graph 430 signals that the ball is sharply increasing in spin rate. This is the start of the Snap phase. The end of the Snap phase can be found in the acceleration graph 410 where the acceleration drops back to zero.

The duration of the Snap phase may be determined by subtracting the timestamp of the end of the phase from the timestamp to the start of the phase, as represented by the shaded portions of the graphs of FIG. 7. The spin rate on the ball at the start of the Snap phase along each axis in the Earth frame of reference may be measured, and the spin rate on the ball at the end of the Snap phase along each axis of the Earth frame of reference may be measured. The speed of the ball at the beginning and end of the Snap phase, and the change in speed during the Snap phase may be measured. Additionally, the distance traveled by the ball during the Snap phase may be determined by recording the three-dimensional location of the ball at the start of the Snap phase, and again at the end of the Snap phase. The magnitude difference between the two locations may be the straight-line distance. Using the aforementioned analysis, the action on the ball during the Snap phase, which is critical to the pitch, may be evaluated and scrutinized by pitchers, coaches, and other interested parties to determine how a pitch is thrown, and what may be done to improve or change various features or aspects of the pitch.

Measuring Lift and Drag

Once a ball is released by a pitcher, following the Snap phase of the pitch, the ball enters the aerodynamic flight portion of the pitch, where the ball is moving through the air and rotating along one or more axes. When a ball is moving through the air and rotating at sufficient rates, lift and drag forces develop enough force to become measurable. These forces affect the flight and path of the thrown ball, and contribute to the complexities of different kinds of pitches, which make the pitches more difficult for a batter to hit, and improve the likelihood of a pitcher being able to strike out a batter. It is desirable to measure the lift and drag forces from within the ball frame of reference using sensors within the ball without requiring an external apparatus. If the magnitude and direction of the lift and drag forces are known, it becomes possible to make detailed measurements of the ball's behavior and its flight path. This information is very useful to players and coaches for the purposes of player improvement and assessment.

Embodiments described herein employ the signals from an acceleration sensor and a magnetic sensor to compute the magnitude of the combined lift and drag and the magnitude of the lift component. The signals may then be processed to remove signal components of noise, centripetal forces, and precession of the spin axes. The disclosed embodiments use relatively low-cost sensors and circuitry to perform the acceleration and magnetic field measurements and overcome challenges involved in the measurement and calculations of the lift force and the drag force by employing a sophisticated chain of signal processing operations. This novel methodology enables the use of inexpensive and compact hardware to obtain a useful dataset.

There are numerous real-world applications for the invention described herein, including sports that involve throwing or hitting a ball and allow a player to impart spin on the ball to modify the flight path of the ball. In most cases, such spin also referred to as "English" is used to make a ball difficult for an opponent to track (e.g., baseball, tennis, cricket, etc.) or to proceed along a specific path or strategic arc (e.g., billiards, bowling, football, soccer, etc.). The imparted spin or English uses lift that is generated by a spinning ball or object moving through the air referred to as the Magnus Effect. A player, particularly a skilled player, can control the spin rate, the spin axis, and the speed of the ball to cause it to move more or less in each given direction perpendicular to the direction of flight. A common example in baseball is the "break" or "movement" employed by baseball pitchers to make the ball more difficult to track for batters.

In any sport, players practice to improve techniques that will benefit them during game play. In baseball, pitchers will practice throwing the ball until they have better control and understanding over the flight parameters that control the lift vector. Embodiments described herein aid in the training process by quantifying the amount and direction of lift that is generated by the ball based on the spin imparted to the ball along one or more axes. The player benefits from a precise value for each direction/amount of lift rather than depending upon visual monitoring of the ball "by eye". Further, players that are recovering from an injury or prolonged absence from the sport can use this information to return to their former performance level and to regain a specific style of throwing.

According to example embodiments provided herein, an object of sporting equipment, and in particular, a baseball, may be embedded with hardware components as described above such that the outside envelope, the appearance, the weight, and the weight distribution are undisturbed, and the ball remains within regulation parameters of the sport. The system embedded within the ball may include an accelerometer and a magnetometer, along with a power supply, processor, and communications interface. An inertial measurement unit (IMU) may also be employed and may be part of the processing unit, but may also use a gyroscope.

During the flight of a thrown ball, the sensors of the systems described herein measure the forces acting on the ball. The accelerometer outputs the sum of all of the forces broken down into three orthogonal axes. In order to isolate the lift value from other forces in the accelerometer signal, it may be necessary to perform a number of operations or analysis to remove the unwanted signals. In order to determine the direction of the lift vector, the optional IMU may supply the orientation relative to the Earth and a mathematical rotation may be performed on the extracted lift signal to obtain the lift magnitude and direction.

As described herein, as a ball enters into the flight phase of a pitch following the Snap phase, the signals from the sensors may be routed to a filter to remove unwanted signals. The resultant, filter signal includes combined lift and drag and is placed on the inputs of the neural network along with the spin rate, which is derived from the sensor data. The output of the neural network is the lift force acting on the ball. This information can be stored or forwarded to the wireless communication interface for transmission and use by other processes and/or the user.

After the Snap phase of the pitch, while the ball is in flight, the signals from the accelerometer and the magnetometer may be sampled at a high rate relative to the spin rate of the ball. For instance, if the ball is spinning at up to sixty rotations per second, the sampling rate should exceed 120 Hz. A higher sample rate may aid in reducing signal noise. The output of the magnetometer may be processed to locate points where the sinusoid crosses the midpoint of the signal in a "zero-crossing". As described above, the total spin may be derived from the magnetometer; however, other methods are available, such as deriving the spin rate from the centripetal force or frequency analysis of the accelerometer signal, and a period of the sinusoid may be established based on sensor data other than that from the magnetometer. The timing of these points are used to find the period of the signal, thus the spin rate of the ball is known. FIG. 8 illustrates two signals—an accelerometer sensor signal 510 and a magnetometer signal 520. Further illustrated is the lift and drag signal 530. The zero crossing points of the magnetometer signal illustrated at 540 are used to determine the period of the sine wave, which establishes the spin rate of the ball.

The period of the sine wave from the accelerometer may be used to create a Finite Impulse Response high pass filter that is implemented as a Moving Average Window filter as shown at 550. This filter may remove the centripetal and precession signals from the accelerometer signal with minimal distortion to the remaining lift and drag signal. The resultant signal contains the combined lift and drag forces centered about zero, as shown in 530.

The magnitude of the X, Y, and Z components of the filtered signal may be computed for each sample during the flight of the ball, where the average magnitude is the average aerodynamic force acting on the ball during its flight. A neural network may be employed to separate the magnitude of the lift force from the magnitude of the drag force. The inputs may be the spin rate of the ball (established as described above) and drag force. The output is the aerodynamic force contributed by the generated lift. The neural network may be prepared using data about the lift and drag coefficients of the type of ball. The lift force may then be used in further computations or be communicated to the user. Once the data is sent to a user device, such as via a communications interface, the user device may display the data in its received form but the user device may also transfer the data to the neural network processor. The neural network processor that has been previously trained may receive the data and transform it into the desired set of measurements. These measurements may then be sent back to the user device for display, storage, or collation, for example.

An accelerometer embedded within the ball may measure the forces acting on the ball in "gravities" in three axes so the signal may be a direct measurement of the amount of force being applied to the ball. When the baseball is pitched in the usual manner, it will be spinning in addition to the forward motion of the ball. The spin and forward motion will result in both a lift force developing, called the Magnus effect, as well as aerodynamic drag. With sufficient spin rate and ball velocity, the output signals of the accelerometer will directly measure the combined effect on these forces. Because the ball is spinning, the axes of the accelerometer are also rotating and therefore the outputs of the accelerometer will have a sinusoidal shape that is related to the spin rate and axis of the ball. The outputs of the device can be treated as a three-dimensional vector that has a direction as well as a magnitude. The total lift and drag force can be found by computing the average magnitude of the vectors during the flight of the ball.

The signal produced by the sensor array and processing element of some embodiments may include additional attributes that make extracting the lift and drag features more complex. If the accelerometer is mechanically offset from the center of rotation, centripetal forces may cause the signals to be offset by an amount related to the spin rate and the amount of the offset. If the weight distribution of the ball is not collocated with the center of rotation, the output signals will exhibit wandering baseline caused by the precession of the spin axis. In order to make accurate measurements, the effects of each of these factors must be mitigated.

Coaching/Teaching Using Processed Data

The above described methods disclose how an object of sporting equipment, such as a baseball, using an embedded sensor array, processing element, and communications interface may gather and process data into useful information regarding the different phases of a sports motion, such as the pitching of a baseball. This information may be used in a variety of ways to improve a player, teach new players, rehabilitate players from injuries, or the like. Described herein are methods of using the data gathered to benefit players and the games they play.

Embodiments in which the instrumented object is a baseball may provide a means to teach, learn, and practice baseball pitching including specific pitch types in a method that is highly informed based on information regarding a pitch that has not previously been as readily available. Presently, coaching of pitchers and a pitcher learning to improve a pitch or certain style of pitch may be a brute force learning technique involving a high number of pitches thrown as different pitch techniques are tweaked without a clear understanding of what each tweak does to the pitch itself. This method requires extensive time, extensive effort, and can be unreliable. Using the above-described system for gathering, processing, and analyzing data, each phase of a pitch may be analyzed such that immediate feedback may be provided to a pitcher following a pitch regarding what occurred in each phase of the pitch, which may be used to inform a pitcher of how to improve the respective phases. This method may enable a seasoned player to evaluate changes in their pitch, desired or undesirable, to understand how to make positive changes or accelerate the rehabilitation of a pitcher from an injury.

Pitching a baseball requires throwing the ball along a specific vector with a specific spin rate and spin axis. Current methods of pitch analysis do not attempt to incorporate this data into the learning process, and methods are unable to provide real time feedback on the data in a manner that could be useful during the pitching practice and coaching process. According to current methods, the feedback for each pitch may be acquired by observing the flight path of the ball, but the factors that control the path of the ball are not broken down into components that influence the path. The most critical parts or phases of a baseball pitch are left as unknown variables in the learning process and the learner is left to discover the relationship between their motion and the result. This prolongs the learning process and raises the potential for fatigue and injury.

Using the technology described herein, a pitch may be analyzed to decipher each phase of a pitch during the wind-up and flight of the ball to provide immediate feedback to the pitcher. The characteristics of the pitcher may be broken down into basic components of ball flight to allow the pitcher to prioritize which factors should be practiced (e.g., tweaked, repeated, etc.) during each session of coaching or practice. Embodiments described herein measure the mechanics of a pitcher through the attachment between an instrumented baseball and the pitcher's hand during the wind-up, and measures the flight of a thrown baseball after it leaves the hand of the pitcher. The mechanics of the pitch may be analyzed to decipher information about the hand motion, wrist motion, elbow motion, shoulder motion, and hip motion leading up to the release of the ball using the forces exerted on the ball as measured by the sensor array, and the path of the ball through space as it is held by a pitcher. The flight characteristics and path of the ball may similarly be measured to establish how the mechanics of the pitching wind-up affected the thrown ball as it travels through space.

The communications interface of the instrumented ball may be used to transmit information to a user device or to a network/cloud based system, where the information may be provided on a user interface to a pitcher, coach, or other individual (e.g., scout) to analyze with respect to the pitcher's motion during the pitch and the characteristics of the pitch, such as the pitch type, path, and speed. A user interface may be configured to display specific data to a user after each pitch through the user interface. Further, visual, tactile, or audio feedback may be provided to provide an indication of improvement, degradation, or meeting certain metrics with regard to each pitch. As embodiments described herein may produce copious amounts of data that can be used in a wide variety of ways, certain parameters may be specified for scrutiny by a user during pitching to improve a pitcher's delivery.

According to example embodiments, a pitcher may throw each pitch in a practice environment and the technology described above can measure the body motion and ball motion during the pitch. This information may then be passed via the communication interface to a user interface to be conveyed to the pitcher. The pitcher may then make adjustments to their grip, stance, body motion, etc. in order to achieve the desired improvement. Each type of pitch can be described as a set of initial flight conditions: speed; spin rate; spin axis; and path. By presenting this data to a pitcher immediately following a pitch, they can immediately understand how their motion may impact each component of the desired pitch. For example, a curve ball may have a spin axis that is tilted (from vertical) a few more degrees than a fast ball. With the technology described herein and method of providing feedback to a pitcher, a pitcher can quickly learn and understand which part of their motion controls the angle of the spin axis. Once they have established how to control the angle, the curve ball can be improved with relative ease.

FIG. 9 illustrates the closed-loop coaching feedback loop where the cycle starts with an action, particularly a sporting action such as pitching a baseball. However, to remain consistent with the primary example disclosed herein, the action is illustrated to begin with a baseball pitch at 610. Assessment of the pitch is performed at 620, which historically would have been observation and measuring parameters such as pitch speed with a radar gun. However, as described above, using the instrumented baseball of example embodiments, the assessment includes processing and analysis of data from the sensor array of the instrumented baseball. As the embodiments described herein can provide feedback virtually immediately, the measured parameters of the pitch may be provided for display at 630 according to the elements of the pitch that a user wants to analyze and adjust. At 640, adjustment may be made, where the pitcher, the coach, or another user makes or indicates what changes to the pitch motion are desirable to improve the pitch. The action occurs again at 610 with the adjustment made such that assessment and display can reflect the revised pitch motion and reflect any improvement realized with substantially immediate feedback.

The teaching/coaching methods that may be realized with the technology described herein provide instant and constructive feedback, together with direct instruction of how improvements/corrections may be made to improve the pitch. These methods accelerate the learning process for acquiring new skills for sports and health and may be a significant component of athletic training for participants at all levels of play. Methods described herein accelerate the learning process by focusing the learning engagement on the parts of the brain most responsible for motion control, or conversely reducing involvement of areas of the brain less involved with motion. Methods put emphasis on the latency of the feedback, the presentation of the feedback and the scope of the content responsive to a thrown baseball.

Using real-time feedback regarding a pitch that was just thrown by a pitcher enables a pitcher to perform small modifications to their throwing motion and to realize immediately what that small modification has done, even if it is a change that is not visible to a human observer. The immediate timeframe, ability to present results on a display and focus the display on the desired component of the pitching phase, and providing suggestions for improvement to the throwing motion may expedite the development of pitching skills in a relatively short time frame as compared to traditional coaching techniques. The feedback loop described above with respect to FIG. 7 may be accomplished in a matter of seconds.

The advanced analytics and diagnostics aspect of the feedback may be automated through application of a neural network, where a database of previously thrown pitches of a certain type may inform a neural network of what pitching mechanics improve that particular type of pitch, and what pitching mechanics adversely affect the type of pitch. For example, a fastball type pitch may benefit from a rapid movement of the wrist around an axis substantially orthogonal to the desired trajectory vector of the pitch. Using the hardware described above, an instrumented baseball may recognize that there is less-than-ideal wrist movement through the Forward phase and Snap phase of the pitch. In such an embodiment, the data from the instrumented baseball may feed a neural network which takes as input the various accelerometer, magnetometer, and gyroscope sensor data and processed data to establish the movement of the arm and wrist during the pitch. The neural network may be able to recognize that the wrist movement of the pitcher during the Forward phase and Snap phase of the pitch is less than ideal and that fastball pitches with a higher degree of wrist snap during the Forward phase and Snap phase produce a fastball with a higher velocity. Thus, the neural network may output a recommendation to produce more wrist motion as the Snap phase is entered to improve the speed of the fastball.

While the aforementioned example describes a method for improving pitching mechanics to achieve an improved a fastball pitch, the advanced analytics and diagnostics process may be used for any type of pitch or any type of sports action in many different sports. In the case of baseball pitching, the neural network is based on a database of previously thrown pitches, where the pitch type is classified, either by a user or by the path, speed, and spin rate/angle of the thrown ball. User input characteristics regarding what makes a pitch good versus bad may also be entered, or the pitches used to teach the neural network may be individually classified as good or bad, or some degree in between. As such, the neural network may use comparisons in order to establish methods for improving a pitch, and the neural network may learn from each pitch thrown with the instrumented baseball.

Crowdsourced Data

While embodiments described above may facilitate data gathering from athletic activities and the ability to provide constructive, immediate feedback, the gathering of this data may be useful for many other purposes beyond the disclosed analytics and diagnostics. For example, as the data is being collected and stored, the data regarding athletic activities may be stored to a network (e.g., a server or cloud based storage system) for compiling with other related athletic activities. This database may be used for comparisons, rankings, and evaluation of athletes on a nationwide or international level without undue effort of physical, in-person evaluations of the athlete.

According to an example embodiment, instrumented baseballs using low-cost sensors described herein may be distributed and sold throughout the world and may become prolific. The people throwing those baseballs and gathering data may not only provide additional input for the neural network learning, but may provide digital resumes of their activities. Using the user interface of the display device that provides feedback to a pitcher, a baseball may be associated with a particular pitcher. That link established between the baseball and the pitcher may be used to track the progress of that pitcher as they train over the course of a single session or over the course of a plurality of sessions. The link between a particular baseball and a pitcher may not require manual configuration in an instance in which a pitcher wears an identifying object, such as a radio frequency identification (RFID) tag. Such a tag may be worn on a pitcher's body, or on a pitcher's glove where the size and mass of the tag would be nominal relative to the glove or clothing of the pitcher. An instrumented baseball may include an RFID tag reader, which may be part of the user interface. When a pitcher having an RFID tag embedded or attached to their glove begins a pitch, the baseball may be brought into the pitcher's glove, as is conventional during a pitch. This close proximity may enable the RFID tag reader of the baseball to read the tag associated with the pitcher, and thus correlate the subsequent pitch motion with the pitcher associated with the RFID tag. When the pitch is complete, the data relating to the pitch, whether it is pre-processed or substantially raw data, may be sent to a user device along with the pitcher identification to associate the pitch metrics with the associated pitcher. In this manner, a training scenario in which multiple pitchers and multiple instrumented baseballs are used may not require a single pitcher keeping track of a single baseball to gather their appropriate metrics, and such an embodiment may eliminate the possibility of a pitcher's metrics being improperly associated with the wrong pitcher.

The pitch metrics gathered that are associated with a pitcher may provide a timeline of pitches and metrics associated therewith. This may enable a pitcher to track improvement or degradation of their performance, and to enable a pitcher to evaluate what phase of their pitch movement has changed to produce the improvement or degradation to learn from the changes.

Such tracking of pitch metrics over time may also provide feedback indicative of an impending injury of a pitcher, such as through degradation of a pitcher's movement or pitch motions that are regarded as high-wear and detrimental to the long term performance of a pitcher. The longitudinal history of a pitcher's pitch motions and pitch metrics may also provide a mechanism to measure a pitcher's improvement, such as from an injury or through training, and provide an indication of when that pitcher may be ready to participate in a game or advance to a more challenging level of baseball competition.

In addition to monitoring longitudinal history of the pitch motions and metrics of a pitcher, data aggregation may provide a mechanism to compare pitchers that may have otherwise gone unnoticed in regions that are not scouted by professional or college scouts for baseball. For example, a pitcher in a rural little league or junior league baseball team may have pitch quality on par or better than 99% of their counterparts. Through data aggregation and comparisons of pitchers using instrumented baseballs, the best pitchers in the state, region, country, or world may be found simply through a review of crowdsourced data. This data repository may optionally be monetized with, for example, a subscription service where data may be available in various levels of detail based on a level of subscription. As apparent to one of ordinary skill in the art, the usefulness of the data collected herein is virtually limitless and the volume of data available will grow over time. Further information can be ascertained from trend analysis, injury statistics, progression and development, or the like. Thus, analytical tools may be implemented to parse the voluminous data and generate information that may be useful in the fields of advanced analytics and diagnostics.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving, from at least one motion sensor associated with an object, acceleration data and angular velocity data of the object in response to an athletic action performed on the object;
   processing the acceleration data to establish vector rotation data between a frame of reference of the object and an Earth frame of reference;
   applying the vector rotation data to the acceleration data to obtain acceleration of the object in the Earth frame of reference;
   applying the vector rotation data to the angular velocity data to obtain angular velocity of the object in the Earth frame of reference;
   providing, as an input to a neural network, the acceleration of the object in the Earth frame of reference and the angular velocity of the object in the Earth frame of reference;
   receiving from the neural network, an analysis of the athletic action performed on the object; and
   providing for display of the analysis of the athletic action.

2. The method of claim 1, further comprising:
   receiving, from the neural network, instruction with regard to the athletic action performed on the object as to how to improve the athletic action relative to an ideal iteration of the athletic action.

3. The method of claim 1, further comprising:
   integrating the acceleration of the object in the Earth frame of reference to obtain velocity of the object in the Earth frame of reference; and
   integrating the velocity in the object in the Earth frame of reference to obtain a position of the object in the Earth frame of reference.

4. The method of claim 3, further comprising:
   establishing a path of the object through the Earth frame of reference in response to obtaining the position of the object in the Earth frame of reference over a period of time.

5. The method of claim 4, further comprising deriving angular acceleration of the object based on the angular velocity data.

6. The method of claim 5, further comprising:
   establishing a rate of rotation of the object based on the angular velocity of the object; and
   establishing at least one axis of rotation in the Earth frame of reference based on the angular acceleration of the object.

7. The method of claim 6, wherein in response to the angular velocity exceeding a range of a sensor to detect the angular velocity, embodiments may include:
   establishing a rate of rotation of the object prior to the angular velocity exceeding the range of the sensor;
   establishing an angular velocity of the object immediately following the athletic action; and calculating the rate of rotation and the angular velocity of the object that exceeds the range of the sensor based on the rate of rotation of the object prior to the angular velocity exceeding the range of the sensor and the angular velocity of the object immediately following the athletic action.

8. The method of claim 1, further comprising:
differentiating the acceleration of the object to obtain an angular jerk of the object; and
determining a Snap phase of the athletic action in response to a positive value for the angular jerk of the object, followed by a negative value for the angular jerk of the object, followed by a value for the angular jerk of the object that falls below a predetermined value.

9. A system for measuring an athletic action comprising:
an instrumented object acted upon by a user performing an athletic action, the object comprising:
at least one accelerometer;
at least one gyroscope;
at least one processor; and
a communications interface
wherein the at least one processor is configured to receive, from the at least one accelerometer, an indication of a direction of gravity in response to the object being at rest;
wherein the at least one processor is configured to receive, from the at least one accelerometer, acceleration data in an object frame of reference; and
wherein the at least one processor is configured to receive, from the at least one gyroscope, angular velocity data in an object frame of reference;
wherein the processor is configured to, using the indication of the direction of gravity, convert the acceleration data in the object frame of reference to acceleration data in an Earth frame of reference, and convert the angular velocity data in the object frame of reference to angular velocity data in the Earth frame of reference.

10. The system of claim 9, wherein the processor is further configured to:
determine angular acceleration of the object in the Earth frame of reference based on a derivative of the angular velocity in the Earth frame of reference;
determine velocity of the object in the Earth frame of reference based on an integration of the acceleration data in the Earth frame of reference; and
determine position of the object in the Earth frame of reference based on an integration of the velocity of the object in the Earth frame of reference.

11. The system of claim 10, wherein the processor is further configured to:
establish a path of the object through the Earth frame of reference in response to obtaining the position of the object in the Earth frame of reference over a period of time.

12. The system of claim 10, further comprising a neural network, wherein the neural network receives the angular acceleration of the object in the Earth frame of reference, the velocity of the object in the Earth frame of reference, and the position of the object in the Earth frame of reference as inputs, wherein the neural network produces a recommendation for improving the athletic action performed on the object in response to an analysis of the inputs against a database of related athletic actions performed on an object.

13. The system of claim 10, wherein the gyroscope comprises an upper spin rate limit wherein in response to the instrumented object exceeding the spin rate limit, the gyroscope signal becomes unreliable, wherein the spin rate of the instrumented object above the spin rate limit is calculated based on at least one of the angular velocity or the angular acceleration prior to the spin rate exceeding the upper spin rate limit and a magnitude of an angular velocity vector of the instrumented object following being acted upon by the user.

14. The system of claim 10, wherein the at least one processor is configured to:
establish a rate of rotation of the object based on the angular velocity of the object; and
establish at least one axis of rotation in the Earth frame of reference based on the angular acceleration of the object.

15. The system of claim 9, wherein the at least one processor is further configured to:
determine, from rotation of the object in the Earth frame of reference, lift and drag forces acting on the object.

16. The system of claim 15, wherein the at least one processor is further configured to:
isolate the lift force from the drag force based, at least in part, on a drag coefficient and a surface area of the object.

17. A method comprising:
receiving, from at least one motion sensor associated with an object, acceleration data and angular velocity data of the object in response to an athletic action performed on the object;
processing the acceleration data to establish vector rotation data between a frame of reference of the object and an Earth frame of reference;
applying the vector rotation data to the acceleration data to obtain acceleration of the object in the Earth frame of reference;
applying the vector rotation data to the angular velocity data to obtain angular velocity of the object in the Earth frame of reference;
determining and isolating lift and drag forces acting on the object;
providing, as an input to a neural network, the acceleration of the object in the Earth frame of reference, the angular velocity of the object in the Earth frame of reference, and the lift and drag forces;
receiving from the neural network, an analysis of the athletic action performed on the object based on the angular velocity of the object in the Earth frame of reference and the lift and drag forces; and
providing for display of the analysis of the athletic action.

18. The method of claim 17, further comprising:
integrating the acceleration of the object in the Earth frame of reference to obtain velocity of the object in the Earth frame of reference; and
integrating the velocity in the object in the Earth frame of reference to obtain a position of the object in the Earth frame of reference.

19. The method of claim 18, further comprising:
establishing a path of the object through the Earth frame of reference in response to obtaining the position of the object in the Earth frame of reference over a period of time.

20. The method of claim 19, further comprising:
deriving the angular acceleration of the object based on the angular velocity data;
establishing a rate of rotation of the object based on the angular velocity of the object; and establishing at least one axis of rotation in the Earth frame of reference based on the angular acceleration of the object.

\* \* \* \* \*